United States Patent
Anvari

(10) Patent No.: US 10,580,301 B2
(45) Date of Patent: Mar. 3, 2020

(54) MOVING VEHICLES IN A SMART ENVIRONMENT

(71) Applicant: Kiomars Anvari, Walnut Creek, CA (US)

(72) Inventor: Kiomars Anvari, Walnut Creek, CA (US)

(73) Assignee: Kiomars Anvari, Walnut Creek, CA (US)

(*) Notice: Subject to any disclaimer, the term of this patent is extended or adjusted under 35 U.S.C. 154(b) by 0 days.

(21) Appl. No.: 16/386,124

(22) Filed: Apr. 16, 2019

(65) Prior Publication Data

US 2019/0311625 A1  Oct. 10, 2019

Related U.S. Application Data

(63) Continuation-in-part of application No. 15/071,910, filed on Mar. 16, 2016, and a continuation-in-part of application No. 15/888,175, filed on Feb. 5, 2018, now abandoned, and a continuation-in-part of application No. 15/193,373, filed on Jun. 27, 2016.

(51) Int. Cl.

| G08G 1/16 | (2006.01) |
| G08G 1/01 | (2006.01) |
| G08G 5/04 | (2006.01) |
| G08G 5/00 | (2006.01) |
| G01S 19/13 | (2010.01) |
| G01S 13/93 | (2020.01) |
| G01S 13/931 | (2020.01) |
| G01S 13/87 | (2006.01) |
| G01S 13/62 | (2006.01) |
| H04L 29/08 | (2006.01) |
| H04W 84/18 | (2009.01) |

(52) U.S. Cl.
CPC .......... *G08G 1/164* (2013.01); *G01S 13/878* (2013.01); *G01S 13/931* (2013.01); *G01S 13/9303* (2013.01); *G01S 19/13* (2013.01); *G08G 1/012* (2013.01); *G08G 1/0112* (2013.01); *G08G 1/0125* (2013.01); *G08G 1/165* (2013.01); *G08G 1/166* (2013.01); *G08G 5/0013* (2013.01); *G08G 5/0043* (2013.01); *G08G 5/04* (2013.01); *H04L 67/12* (2013.01); *H04W 84/18* (2013.01)

(58) Field of Classification Search
CPC ....... G08G 1/164; G01S 13/867; G01S 13/62; G01S 13/93; G06K 9/00664
USPC .......................................................... 701/301
See application file for complete search history.

(56) References Cited

U.S. PATENT DOCUMENTS

| 2005/0057372 A1* | 3/2005 | Taylor ...................... G08G 1/00 340/901 |
| 2007/0276600 A1* | 11/2007 | King ...................... G08G 1/042 701/301 |

(Continued)

*Primary Examiner* — Tan Q Nguyen

(57) ABSTRACT

Smart environments represent the next evolutionary development step in transportation systems. Like any functioning organism, the smart environment relies first and foremost on sensory data from the real world. Sensory data comes from multiple sensors of different modalities in distributed locations. Sensors used by various moving, flying and stationary objects exchange information through broadcasting or indirectly through public or private networks. The information helps various moving vehicles and stationary objects coexist and operate freely without any interruption, interference, and collision.

13 Claims, 21 Drawing Sheets

(56) References Cited

U.S. PATENT DOCUMENTS

| | | | |
|---|---|---|---|
| 2010/0169009 A1* | 7/2010 | Breed | B60N 2/2863 701/301 |
| 2012/0271491 A1* | 10/2012 | Spata | G01W 1/00 701/3 |
| 2013/0144490 A1* | 6/2013 | Lord | B60T 17/22 701/41 |

* cited by examiner

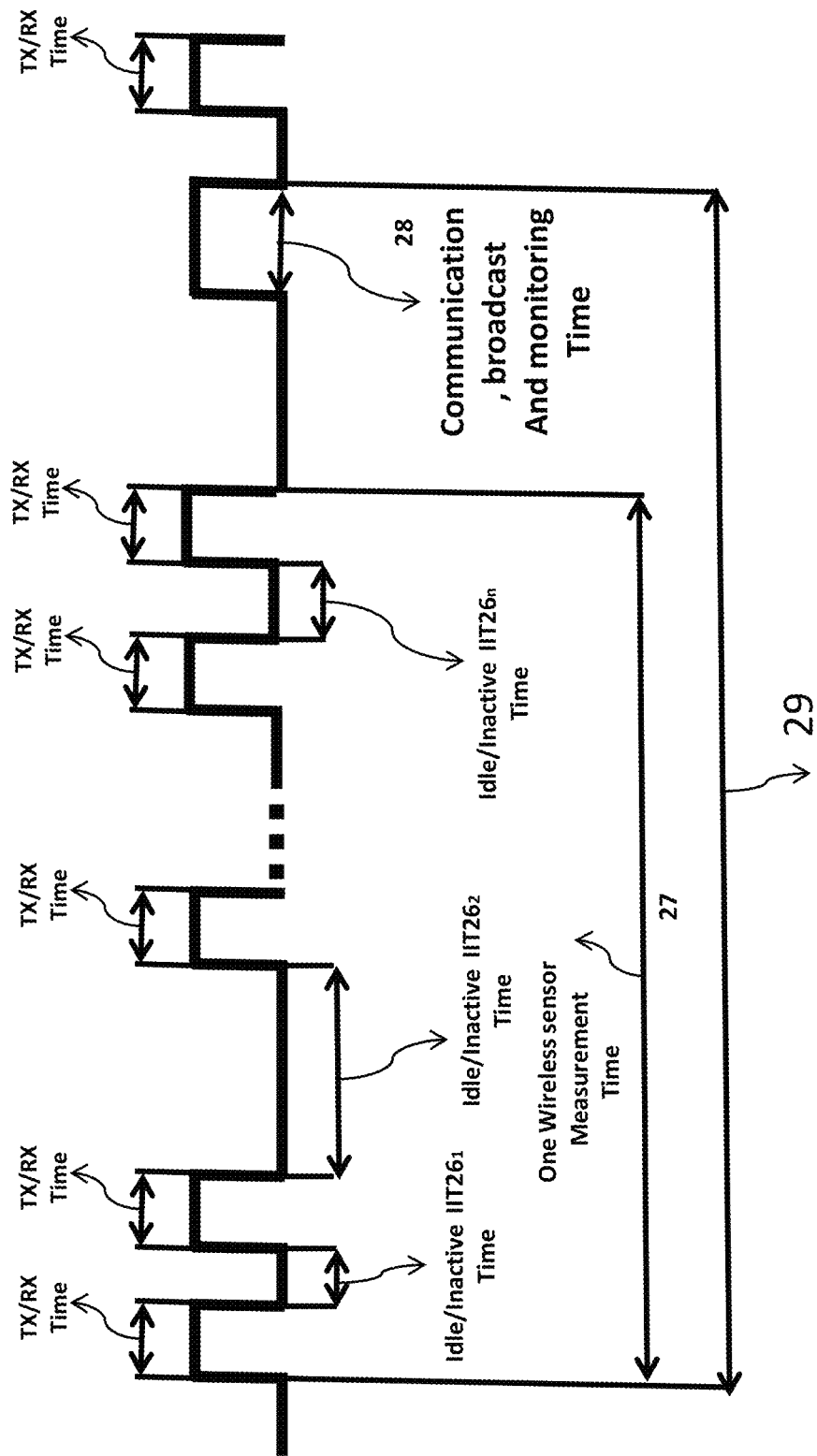

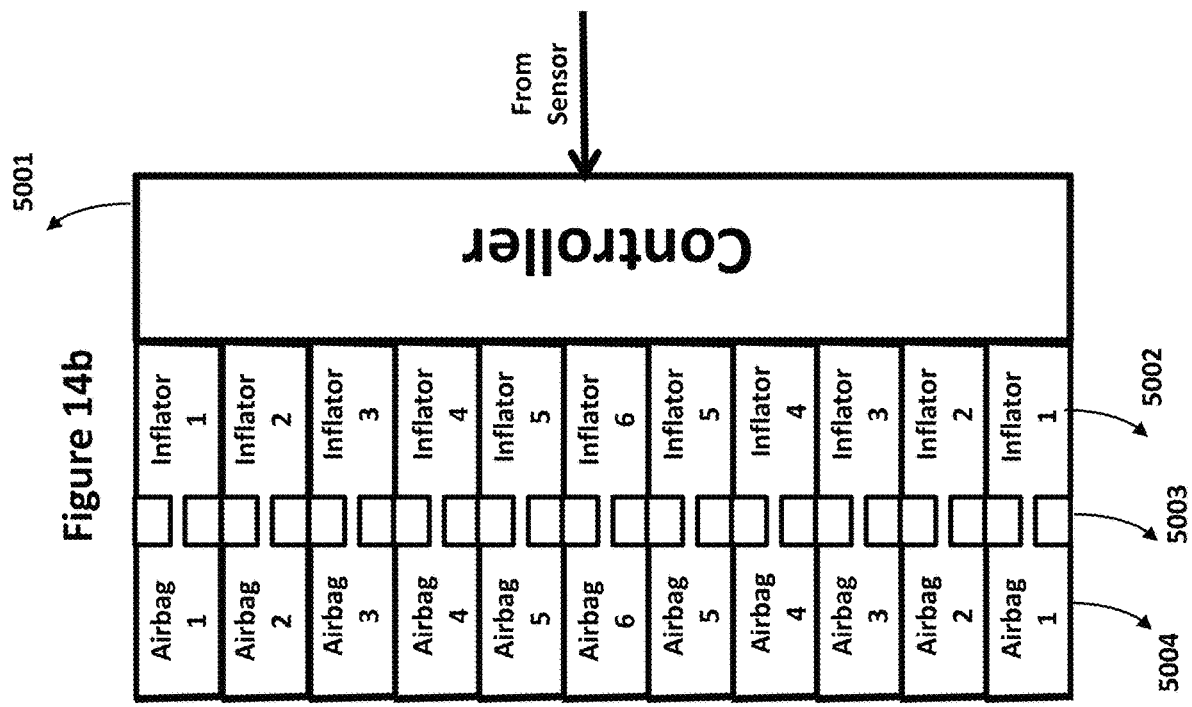
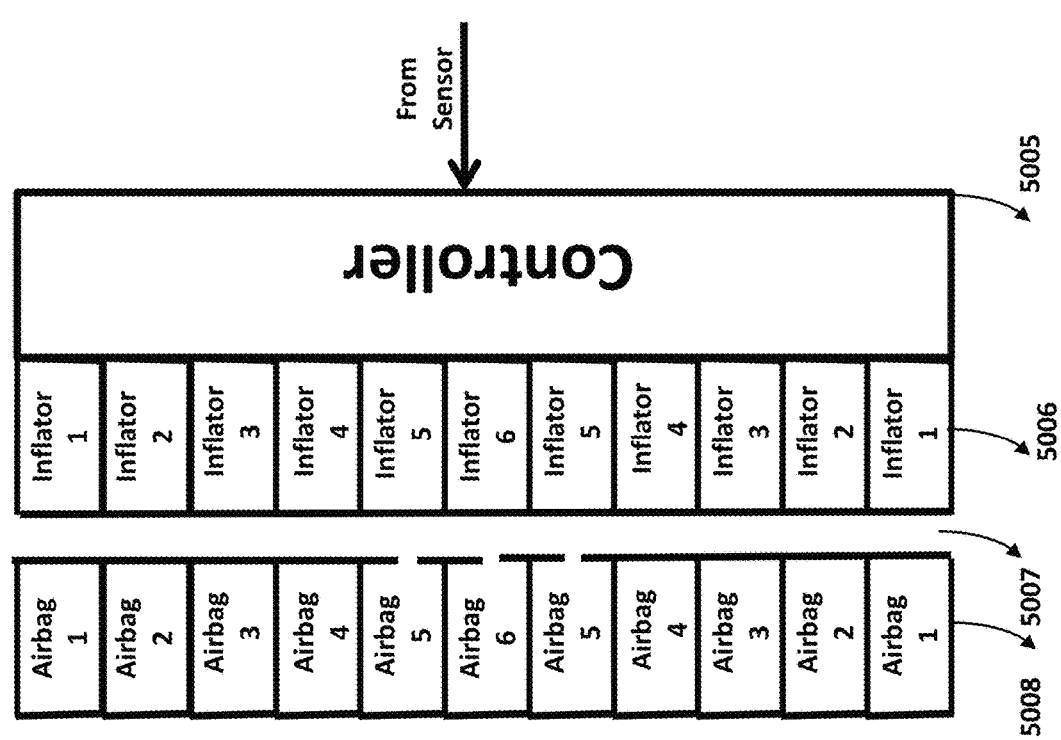

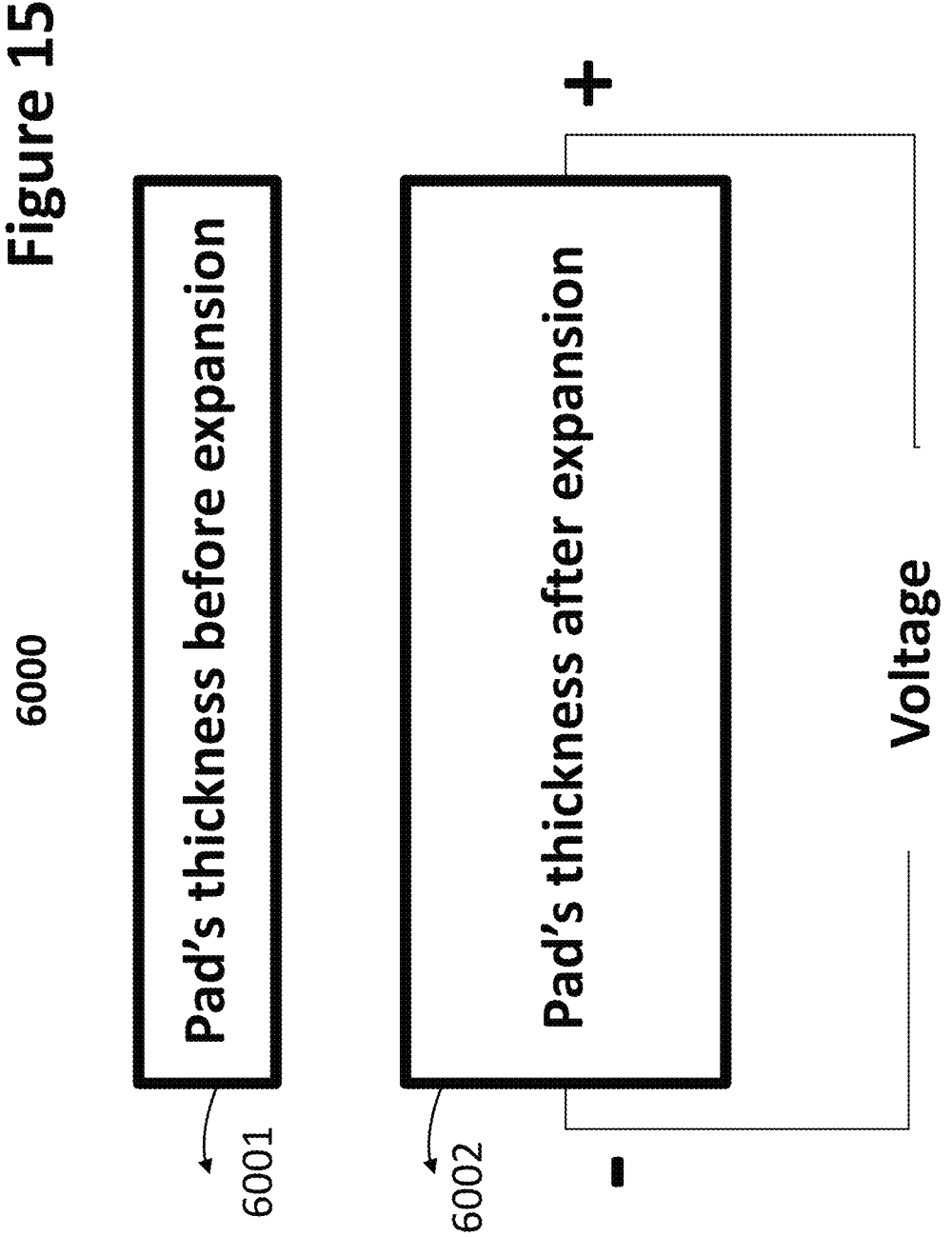

7001 → Controller is reset, the configuration parameters are set and start executing the artificial intelligence executable software 7002 → controller is triggered by information data from one or multiple sensors 7003 → controller based on its configuration parameters select which expandable pad to activate in order to reduce the force or impact 7004 → controller based on its configuration parameters select the multi-layer airbags to be activated 7005 → The airbag inflators generate the gas that is needed to inflate the selected multi-layer airbags and a voltage is applied across two ends of selected pad

MOVING VEHICLES IN A SMART ENVIRONMENT

The application claims priority to the following related applications and included here is as a reference.

Application: U.S. patent application Ser. No. 15/071,910 filed Mar. 16, 2016 and entitled "A CONTROL ALGORITHM FOR WIRELESS SENSOR TO ESTIMATE AND CALCULATE ENVIRONMENTAL PARAMETERS".

Application: U.S. patent application Ser. No. 15/193,373 filed Jun. 27, 2016 and entitled "PROTECTION AND GUIDANCE GEAR OR EQUIPMENT WITH IDENTITY CODE AND IP ADDRESS".

Application: U.S. patent application Ser. No. 15/888,175 filed Feb. 5, 2018 and entitled "PROTECTION FOR MOVING EQUIPMENTS AND OBJECTS".

BACKGROUND

Developing intelligent transportation systems which take into consideration the economical, environmental, and safety factors of the modern society, is one of the main challenges of this century. Progress in the fields of mobile robots, control architectures, advanced technologies, and computer vision allows us to now envisage the integration of autonomous and driving-assistance capabilities within future moving vehicle s. Research concerning the development of self contained unmanned moving vehicles is currently being carried out on a very active scale. The existing types of unmanned moving vehicles are designed so that the travel sections thereof are equipped with wheels crawlers etc and in which the travel motion is accomplished under the control of a control section.

Smart environments represent the next evolutionary development step in industries such as construction, manufacturing, transportation systems and even in sporting goods equipment. Like any functioning organism, the smart environment relies first and foremost on sensory data from the real world. Sensory data comes from multiple sensors of different modalities in distributed locations. The smart environment needs information about all of its surroundings as well as about its internal workings.

The challenge is determining the prioritized hierarchy of: (1) detecting the relevant quantities, (2) monitoring and collecting the data, (3) assessing and evaluating the information, and (4) performing decision-making actions. The information needed by smart environments is provided by Distributed Sensor Systems, which are responsible for sensing as well as for the first stages of the processing hierarchy.

The drive to minimize human interaction in transportation vehicles is stronger than ever, especially in public transportation, automobiles, and etc. For instant, just a few years ago, automobiles seldom had very sophisticated safety systems. Now, it is rare to find an automobile without various safety and protection systems. And now new technology is evolving to the point of being able to offer preventive methods to better manage and dissipate sudden impact energy to the vehicle.

The use of radars in collision avoidance systems is generally known. U.S. Pat. No. 4,403,220 dated Sep. 6, 1983 discloses a radar system adapted to detect relative headings between aircraft or ships at sea and a detected object moving relative to the ground. The system is adapted to collision avoidance application. U.S. Pat. No. 4,072,945 dated Feb. 7, 1978 discloses a radar-operated collision avoidance system for roadway vehicles. The system senses the vehicle speed relative to an object and its distance and decides whether the vehicle is approaching the object at a dangerously high speed. A minimum allowable distance represented by a digital code is stored in a memory of a computer and the minimum allowable distance is compared with the distance sensed by the radar. U.S. Pat. No. 4,626,850 dated Dec. 2, 1986 discloses a dual operational mode vehicle detection and collision avoidance apparatus using a single active or passive ultrasonic ranging device. The system is particularly adapted to scan the rear and the lateral sides of the motor vehicle to warn the vehicle user of any danger when changing lanes.

Most of the prior art collision avoidance systems use microwave radars as the ranging and detecting device. There are multiple problems of these automobile collision avoidance systems when microwave radars are used. One major issue is related to the beam width that is the angular width of the main lobe of the radar, and the associated angular resolution of the microwave radar. The beam width is inversely proportional to the antenna diameter in wavelength. With the limitation of the antenna size, it is very difficult to make reasonable size microwave radar with beam width less than 3 degrees. At the desired scanning distance, this beam width will scan an area which is much too big and thus is too nonspecific and difficult to differentiate the received echoes. Besides getting echo from another car in front of it, this radar will also receive echoes from roadside signs, trees or posts, or bridges over passing an expressway. On highways with divided lanes the microwave radar will receive echoes from cars 2 or 3 lanes away and has difficulty in differentiating them from echoes coming from objects in the same lane. Because of the poor angular resolution of microwave radars, the direction of objects cannot be specifically determined and objects too close to one another cannot be separated. The angular resolution of microwave radars is not small enough for them to be effectively used to monitor roadway traffic. The other issue is that the microwave radars have difficulty in distinguishing radar signals coming from adjacent cars with similar equipment. If there are more than two cars with the same radar equipment on the same scene, the signals become very confusing.

The ultrasonic ranging and detecting device's angular resolution is also too poor to be effectively used in roadway traffic monitoring. The ultrasonic devices have even more problems than the microwave radars in determining the direction and location of echoes precisely, in the detection of directional change of objects and in avoiding signals coming from adjacent vehicles with similar equipment Systems and devices for collision avoidance of air, sea and ground vehicles are in general well known. Early devices utilized forward looking antennae with radio frequency transmitters and receivers. In U.S. Pat. No. 3,891,966 Sytankay disclosed a laser system designed to avoid rear end collisions between automobiles. This apparatus provides a laser transmitting and receiving system and a detection system mounted on the front and rear of automobiles. The transmitter at the front end emits a signal having a designated wavelength f1 and the receiver at the front end receives signals having a designated wavelength f2. Upon reception of signals of wavelength f1 the modulator at the rear end of a leading car would activate the transmitter which would send a return signal of wavelength f2 to the receiver at the front end of the trailing car. This signal is interpreted by circuits in the receiver and furnishes a warning of the proximity of the vehicles.

Sterzer et al in U.S. Pat. No. 4,003,049 shows a frequency modulated continuous wave collision avoidance radar responsive to both reply signals from cooperating tagged targets and to skin reflections from proximate non cooperating non tagged targets. German Patent No 2,327,186 and U.S. Pat. No. 4,101,888 to Heller et al describe a system in which detections are limited to the electronic road channel in which the vehicle is traveling. The radar has two antennas which radiate RF signals of different frequencies. The signals received by one of the two antennas are evaluated by determining the difference between the amplitudes of the RF signals reflected from an object. A signal proportional to the difference is then compared to a threshold proportional to a predetermined azimuth range so that cars moving in the same road lane may by discriminated against other passing objects.

More recent devices employ a millimeter wave antenna capable of electronic scanning. An example is shown in U.S. Pat. No. 5,264,859 to Lee et al in which a linear ferrite loaded slot array illuminates a dielectric lens. Beam scanning is achieved by controlling a bias magnetic field along the ferrite rod of the slot array. More advanced systems might employ a conformal array disposed within or around car structures such as bumpers. Such antenna systems are generally taught by Special in U.S. Pat. No. 5,512,906. A more complete total avoidance system is discussed by Shaw et al in U.S. Pat. No. 5,314,037. Here the laser detection system is coupled to both warning and automatic car control devises such as steering and braking systems in order to take evasive action. Obviously such complex systems are expensive to build and will have a lower inherent reliability. Although the above systems may find utility in avoiding front and rear collisions they are not adapted for early warning of imminent side collisions.

The above techniques and solution can also be applied for flying objects or any moving equipment such as drones, flying cars, robots, and in general moving equipment and flying equipments.

One effective and novel ways of minimizing collision and maximizing safety is to monitor the environment and to predict the impact using distributed sensors. Distributed sensors estimate and calculate environmental parameters related to external objects. Therefore, as shown in FIG. 1 the information collected by wireless sensors and other type of sensors such as image sensors, heat sensors, speed sensors, acceleration sensors, ultrasonic sensors, proximity sensors, pressure sensors, G sensors, and IR (infrared) sensors could be used for a variety of applications. One application is to help navigation of the vehicle and minimizes driver interference or even facilitates vehicle navigation without a driver. Another application is to provide warning for driver of the vehicle. The collected information could also be used to activate certain devices like expandable pads, airbags, or compressed air before an impact occurs. This feature can be used both internal and external to the moving vehicle. The airbags or expandable pads can be mounted on external body of vehicle and activated before the impact to absorb the force of impact for both protection of vehicle and its passengers. The wireless sensors collect the required information in presence of other vehicles which are equipped with the same technology. This requires establishment of a standard for wireless sensors used for vehicles application so that all vehicles use the same technology. This way every moving or flying vehicle/object can be assigned a unique identification address similar to an IP (Internet Protocol) address to be used by wireless sensor installed at its different body location. In other words every moving vehicle/objects or flying vehicle/objects is assigned an IP (Internet Protocol) address similar to an IP communication networks. The IP address can be used internally to communicate with central controller of moving or flying object/vehicle The IP address can also be used to communicate with external communication networks such as cellular wireless network (5G and beyond) or private and proprietary network. The signal that wireless sensor uses to monitor its surrounding environment is based on moving or flying vehicle/object IP address. By applying this technique and additional algorithm any interference between wireless sensors used in all moving or flying objects/vehicles present in near vicinity can easily be avoided and usable information gathered in timely manner.

To complement the environment information obtain by a wireless sensor an image sensor may be used. The image sensor uses the images from environment to identify various objects in the environment and obtain essential parameters. To increase the accuracy of the parameters the image sensor is calibrated extensively for various objects in a typical environment. The calibration data and pixels from environment images obtained by image sensor are used to monitor the environment.

For flying objects two of possible protection gears are airbag and compressed gas systems. Airbags have evolved with regards to design, fabric and the components that go into making it. Compressed gas (air) systems are in nearly most industrial facilities around the world.

Compressed air is air kept under a pressure that is greater than atmospheric pressure. In industry, compressed air is so widely used that it is often regarded as the fourth utility, after electricity, natural gas and water. However, compressed air is more expensive than the other three utilities when evaluated on a per unit energy delivered basis. Compressed air is used for many purposes, including:

Railway breaking system: A railway air brake is a railway brake power braking system with compressed air as the operating medium.

Road vehicle breaking system: An air brake or, more formally, a compressed air brake system, is a type of friction brake for vehicles in which compressed air pressing on a piston is used to apply the pressure to the brake pad needed to stop the vehicle.

Air guns: An air gun is any kind of small arms that propels projectiles by means of mechanically pressurized compressed air or other gas (shooting involves no chemical reaction), in contrast to explosive propellant of a firearm.

An airbag is made up of three parts. The first part is the bag itself that is made out of thin nylon fabric and is folded in the steering wheel or the dashboard of a car. The second part of the airbag is the sensor that informs the bag to inflate when the car meets with an accident. The sensor detects the collision force and calculates the force equal to running into a brick wall at around 10 to 15 miles per hour. The third part consists of an inflation system.

The airbags are inflated using sodium azide and potassium nitrate. When any collision takes place, the sensor detects the collision force and informs the bag to inflate. At that time, the sodium azide and potassium nitrate react quickly and produces a large pulse of hot nitrogen gas. The gas inflates the bag in turn and the bag literally bursts out of the steering wheel or the dash board. After a second, the bag starts deflating with the help of the holes present on it to get out of your way.

When an airbag is used for protection and is activated before impact it is highly likely that a single layer airbag bursts and does not provide the required protection. Therefore, there is a need for redundancy in case the airbag due to force of impact bursts. Redundancy may be achieved by having nested airbags or multilayer airbags.

Expandable pad can also be used for moving vehicle/object and it is made of polymers that can be expanded by applying voltage to two ends of the pad. The pad after activation may need to be replaced.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In one aspect, a protection system using distributed sensors to monitors its surrounding environment and detect any potential impact with an object.

In one aspect, the protection system can be used for various moving or flying vehicles/objects to protect them from any detected impact.

In another aspect, each individual sensor within the protection system has an IP (internet protocol) address and uses a proprietary or a standard protocol to communicate with a central controller in the protection system or moving vehicle/object similar to an IP communication network.

In one aspect, the protection system uses distributed wireless sensor and distributed image sensors.

In one aspect, each wireless sensor within the distributed wireless sensors uses an independent and different IP address to transmit over the air a transmit signal which has its IP address embedded in the transmit signal and receive the reflected transmit signal bounced back from objects in its surrounding environment. Each wireless sensor can also embed the same IP address it uses to communicate with the central controller in the protection system or moving vehicle/object for the over the air transmit signal.

In another aspect, all distributed wireless sensors can use the same IP address for over the air transmit signal.

In one aspect, each wireless sensor's transmit signal with embedded IP address is fragmented. Then the wireless sensor each time transmits a fragment of the transmit signal and receives the reflected fragment of transmit signal until all fragments are transmitted. This is done to improve accuracy as well as reduce complexity.

In another aspect, the protection system is identified by an IP address which is the IP address that identifies the moving or flying vehicle/object. This IP address is also embedded in the transmit signal of wireless sensor.

In one aspect, one or all of the wireless sensors used by protection system of moving or flying vehicle/object broadcasts a location of the wireless sensor, time of the day, propagation time through wireless sensor's transmitter up to antenna port, and body mass of the moving or flying vehicle/object using a proprietary or a standard protocol.

In another aspect, the wireless sensor uses GPS (Global Positioning System) receiver to obtain location and time of the day.

In one aspect, the protection system acts as an Internet of things (IoT) and uses one of its wireless sensors to communicate with a cellular (5G and beyond) network, a WiFi network, a private network or any proprietary network. When wireless sensor communicates with a private or proprietary network it uses a protocol define by a standard body or a proprietary protocol.

In another aspect, the protection system of a moving or flying vehicle/object through its wireless sensor or transceiver communicates its IP address, type, location, mass, time of the day, and propagation time through wireless sensor's transmitter up to antenna port to a cellular (5G and beyond) network, a WiFi network, a private network or any proprietary network.

In one aspect, the protection system of a moving or flying vehicle/object through communication with a cellular (5G and beyond) network, a WiFi network, a private network or a proprietary network obtains IP address, type, location, mass, time of the day, and propagation time through wireless sensor's transmitter up to antenna port of other objects in the surrounding environment.

In one aspect, a stationary object in the surrounding environment of the moving or flying vehicle/object uses its wireless transceiver to broadcast its type, IP address, location, time of the day, propagation time through its transceiver's transmitter up to antenna port.

In one aspect, the time of the day that is broadcasted is in form of a time stamp which can be used by other objects to calculate distance.

In another aspect, the stationary object that uses wireless technology is a lamp post, a building, a tree, a stationary vehicle/object, a traffic light post, a statue, and any other stationary object in the surrounding environment.

In one aspect, the wireless transceiver (wireless sensor) changes its carrier frequency and modulation for better, faster transmission and reception of information.

In another aspect, a wireless sensor can obtain information about its surrounding environment such as location, mass, and type of an object with potential impact.

In another aspect, the protection system uses distributed image sensors to monitor its surrounding environment and detect any potential impact with an object.

In one aspect, each image sensor is calibrated to measure distance using typical objects in the surrounding environment.

In one aspect, both wireless sensor and image sensor independently calculate the same parameters of surrounding environment for better detection of potential impact with an object.

In one aspect, a distance calibration of image sensor is based on a number of typical objects in its surrounding environment and stored in a memory inside the image sensor as a distance calibration matrix database.

In another aspect, each image sensor uses an IP address to communicate with a central controller in the protection system of moving or flying vehicle/object.

In one aspect, the protection system uses and activates airbag, expandable pad, and compressed air for protection before impact.

In another aspect, the airbag consists of redundancy by having an outer airbag and a number of nested airbags.

In one aspect, the nested airbag is inflated sequentially starting with the last or smallest nested airbag, and then the airbag the smallest or last airbag nested in, and finally the outer airbag.

In another aspect, a subset of the airbags is inflated depending on the force of impact detected by the protection system through its wireless sensors and image sensors.

In one aspect, when a subset of airbags is inflated the gas that belongs to the airbags that are not inflated needs to be routed to the airbags that are inflated using a control mechanism since the total amount of gas the inflated airbags need does not change.

In another aspect, immediately after impact depending on the force of impact or configured data a number of nested airbags starting from the last and smallest one will collapse by releasing their air using a deflating mechanism. This way the outer airbag and nested airbags that are not deflated partially collapse and provide wider protection.

In one aspect, the protection system uses compressed air to protect the moving or flying vehicle/object by releasing the air before impact.

In another aspect, the protection system uses a central compressed air unit with a number of outlets and when an impact is detected releases the central compressed air unit and opens the appropriate outlets.

In one aspect, the protection system uses expandable pad to protect the moving or flying vehicle/object by applying voltage to two ends of the pad. This results in the pad thickness to increase and provide more padding for the moving or flying vehicle/object.

BRIEF DESCRIPTION OF THE DRAWINGS

FIGS. 7a through 7e illustrate embodiments of transmit signal for wireless sensor.

FIGS. 14a through 14c show an embodiment of a plurality of inflators FIG. 15 depicts an embodiment of an expandable pad FIG. 16 depicts an embodiment of a method for using multilayer airbag to protect a moving objects The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
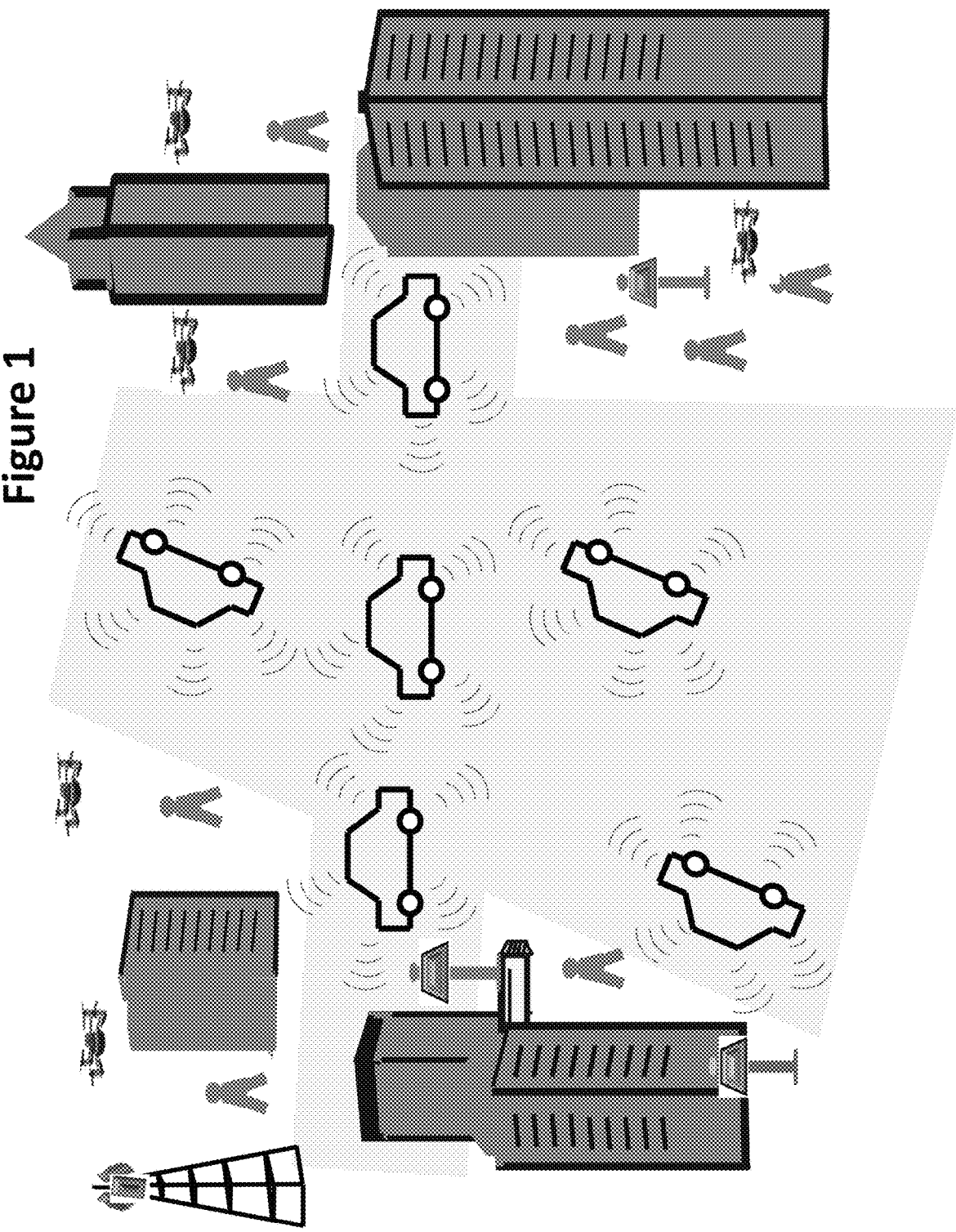
FIG. 1 illustrate a typical surrounding environment scenarios for moving and flying vehicles/objects FIG. 2 illustrate typical moving and flying vehicles/objects that can be found in an environment FIG. 3 illustrate typical moving or flying vehicles/objects that can be found in an environment communicating with cellular network
Figure 2:
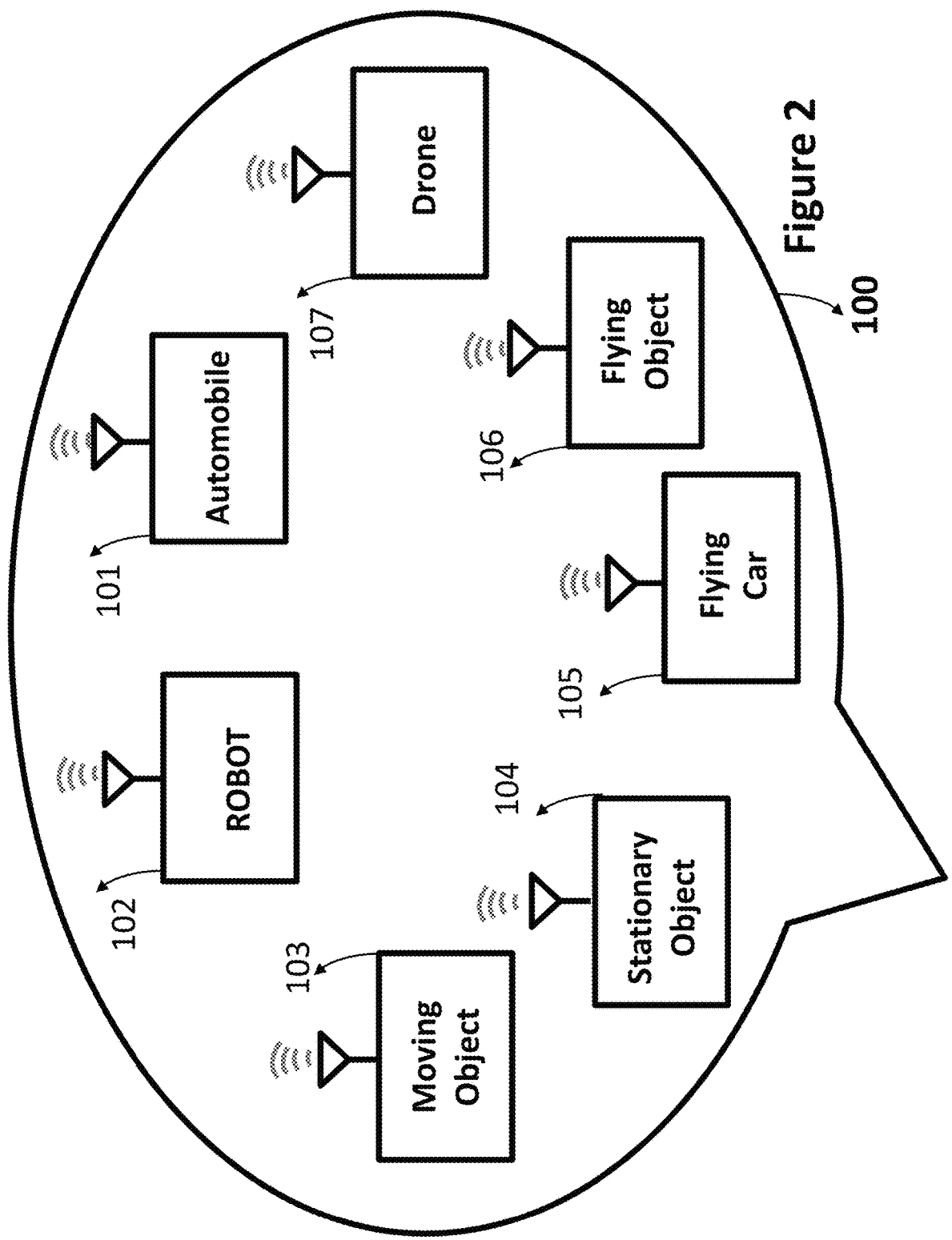

FIG. 2 depicts a smart environment 100. In general, in the smart environment 100 in addition to open space various stationary, moving and flying object exist. In the smart environment or area 100 all the objects coexist and operate freely without any interruption, interference, and collision.

Smart environment 100 includes, among other things, automobile 101, robots 102, moving objects 103, stationary objects 104, flying car 105, flying object 106, and drone 107.

In one embodiment, moving object 103 is human with body amour, bicycle, motorbike, boat and etc.

In one embodiment, stationary object 104 is a tree, a lamp post, a small cell, a building, a statue and etc.

In another embodiment of smart environment 100, flying object 106 is a helicopter, a small plane, a flying human, a flying robot, a glider, and etc.

In one embodiment of smart environment 100, automobile 101, robot 102, moving object 103, stationary object 104, flying car 105, flying object 106, and done 107 support a wireless transceiver to broadcast certain information specific to automobile, robot, moving object, stationary object, flying car, flying object, and drone.

In another embodiment of smart environment 100, the broadcast information includes a time stamp indicating time of the day, type of the object, location obtained from GPS (global positioning system) receiver, an identity number, signal propagation time through transmitter of the wireless transceiver up to the input of transmit antenna, and estimated mass.

In one embodiment, the identity number of an object is its serial number.

In one embodiment, the identity number of an object is an IP (Internet Protocol) address.

In another embodiment of smart environment 100, each object in the environment receives the broadcast information from other objects and is fully aware of its surrounding environment.

In one embodiment of smart environment 100, each object in the environment uses a protocol that is known to all objects for broadcasting its information.

In one embodiment of smart environment 100, the broadcast protocol is defined by a standard body like IEEE (Institute of electrical and electronic engineering) or cellular network (5G and beyond).

In another embodiment, the broadcast protocol includes frames with a synchronization pattern for the receiver of wireless transceiver used by each objects to synchronize and detect the broadcast information.

In one embodiment, the payload in each broadcast frame which consists of an object's information is compressed to reduce time and the bandwidth required for transmission of the frame.

In one embodiment, one or more synchronization pattern are stored in the wireless transceiver or obtained from other public or private networks.

In another embodiment, an object in the smart environment 100 uses the time stamp received from another object, transmitter propagation time received from another object in the smart environment 100, and receiver propagation time of its own transceiver to estimate a distance between the two objects. Then from two consecutive estimated distances approaching speed of the two objects towards each other can be estimated. Further more from change in speed, an acceleration or a deceleration is obtained which is used to estimate an impact force between two objects using the mass of the two objects.

In another embodiment, an object in the smart environment 100 uses GPS location of other objects received from their broadcast information to calculate the distance between itself and other objects.

Figure 3:
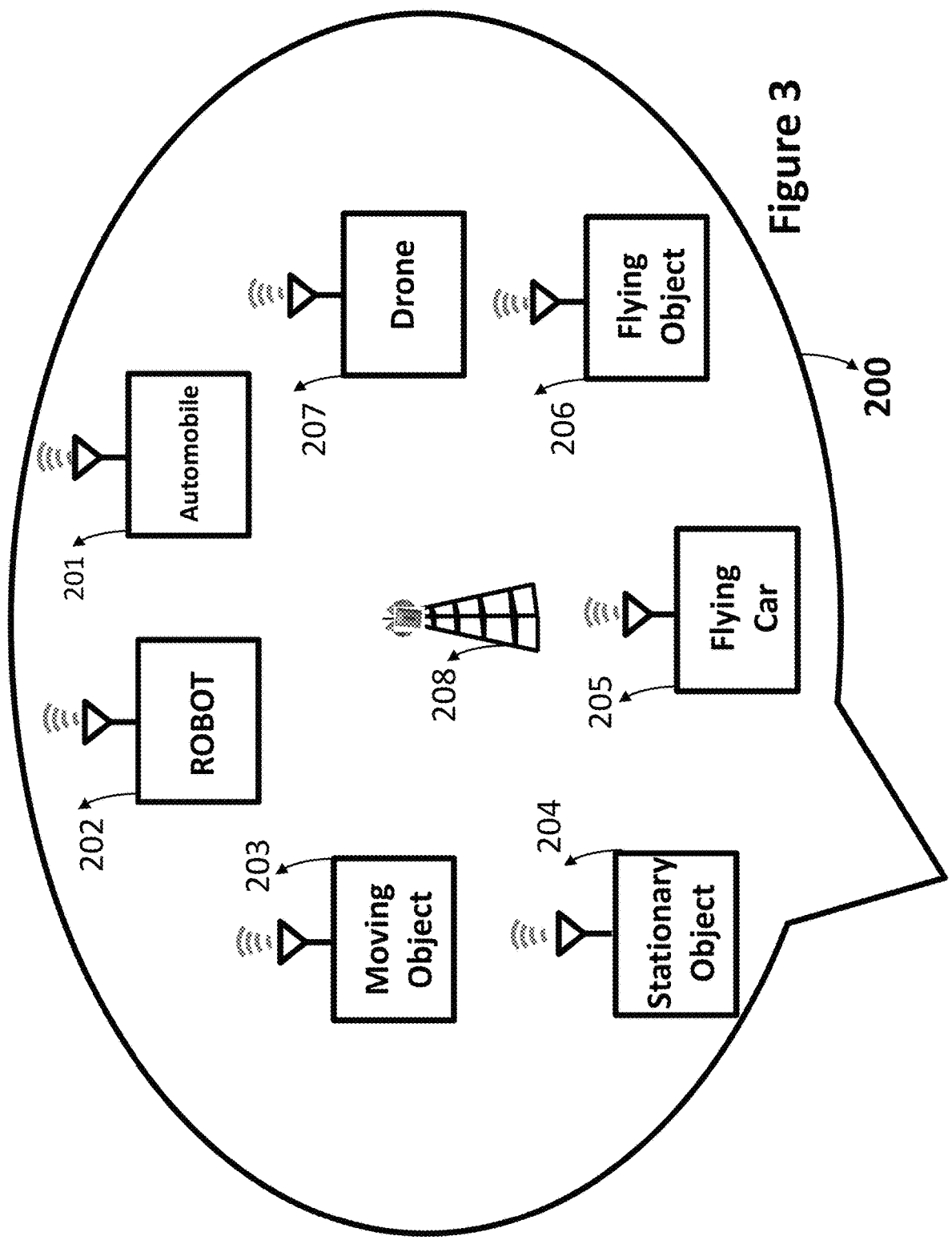

FIG. 3 depicts a smart environment 200 with objects that communicates with a public or private network. In general, the smart environment 200 in addition to open space consists of various stationary, moving and flying objects that are capable of wirelessly communicate with a public or private communication network. In the smart environment 200 all the objects coexist and operate freely without any interruption, interference, and collision.

In one embodiment smart environment 200 includes, among other things, automobile 201, robots 202, moving objects 203, stationary objects 204, flying car 205, flying object 206, drone 207, and a wireless base station 208 that supports a public or private communication network.

In one embodiment, the wireless base station 208 communicates with cellular network 5G (fifth generation) and beyond.

In one embodiment, the wireless base station 208 is a cellular (5G and beyond) small cell, macrocell, microcell or picocell.

In another embodiment, the wireless base station 208 is WiFi that is connected to cloud network as well as cellular network (5G and beyond).

In one embodiment, the wireless base station 208 is part of a private network that is connected to cloud network as well as cellular network (5G and beyond).

In another embodiment, the wireless base station communicate with the stationary, moving and flying objects in the smart environment 200 and obtains type, location (obtained from GPS receiver), identity number, signal propagation time through transmitter of the wireless transceiver up to the input of transmit antenna, and estimated mass from objects 201, 202, 203, 204, 205, 206 and 207.

In one embodiment, wireless base station 208 in the smart environment 200 broadcast the information obtained from each object 201, 202, 203, 204, 205, 206 and 207 to let an object in the smart environment 200 obtain the information from wireless base station 208.

In one embodiment, each moving and stationary objects 201, 202, 203, 04, 205, 206 and 207 continuously updates the information it obtains from wireless base station 208 related to other objects in its surrounding smart environment 200.

In another embodiment, the identity number of each object in the smart environment 200 is the object's serial number or an IP address that can be an IP4 or IP6.

In one embodiment, the wireless base station 208 in smart environment 200 supports IEEE1588 (Institute of electrical and electronic engineering synchronization standard 1588) which provides clock synchronization and time of the day for wireless base station 208 through data communication network.

In another embodiment, the wireless transceiver used by each moving and stationary objects 201, 202, 203, 204, 205, 206 and 207 also supports IEEE1588 to synchronize with base station 208 and obtain time of the day.

In one embodiment, wireless base station 208 broadcasts to the wireless transceiver of each moving and stationary objects 201, 202, 203, 204, 205, 206 and 207 the absolute time when they can broadcast their information.

In one embodiment, in order to avoid collision wireless base station 208 broadcasts to the wireless transceiver of each moving and stationary objects 201, 202, 203, 204, 205, 206 and 207 the absolute time when they can transmit a unique IP address signal and receive the reflected unique IP address signal from various objects in the smart environment 200 to measure a distance and an approaching speed of various objects.

In one embodiment, wireless base station 208 broadcasts to the wireless transceiver of each moving and stationary objects 201, 202, 203, 204, 205, 206 and 207 the carrier frequency and modulation for transmission and reception.

In one embodiment, each moving and stationary objects 201, 202, 203, 204, 205, 206 and 207 exchange Ethernet frames with wireless base station 208.

In one embodiment, the link between each moving and stationary objects 201, 202, 203, 204, 205, 206 and 207 and wireless base station 208 is Ethernet.

In one embodiment, communication between each moving and stationary objects 201, 202, 203, 204, 205, 206 and 207 and the cloud through wireless base station 208 support a single Ethernet link layer protocol.

Figure 4:
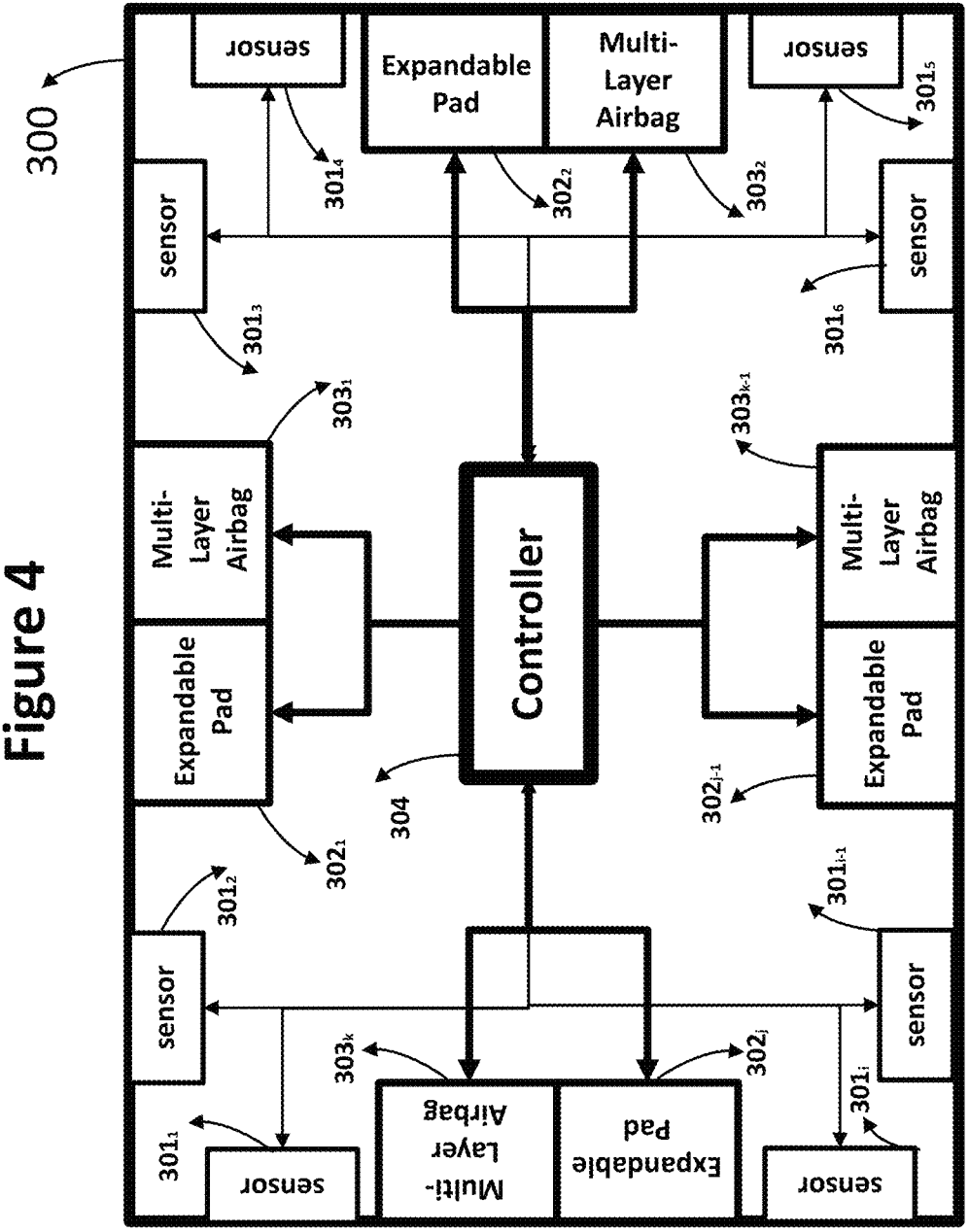
FIG. 4 depicts a moving or flying vehicles/objects using expandable pads and multilayer airbags for protection

FIG. 4 illustrates an embodiment of a vehicle/object 300. In general, the vehicle/object 300 provides external body protection by applying voltage to two ends of an expandable pad and/or inflating a multilayer airbag. The controller 304 receives an information data related to operation status of the vehicle/object 300 and an information data from various objects in surrounding environment of the vehicle/object 300 from sensors $301_1$ to $301_i$ to detect any malfunction of the vehicle/object 300 or approaching of external objects that results in an impact. When controller 304 detects a potential impact based on its artificial intelligence analyses of the information data received from sensors $301_1$ to $301_i$ which include information data related to internal devices and external objects in the surrounding environment, it activates one or more of the expandable pads $302_1$ to $302_j$ and/or activates one or more of the multilayer airbag $303_1$ to $303_k$ to minimize the damage to the vehicle/object 300 due to impact.

Vehicle/object 300 includes, among other things, sensors $301_1$ to $301_i$, controller 304, expandable pads $302_1$ to $302_j$, and multilayer airbags $303_1$ to $303_k$.

In one embodiment, the vehicle/object 300 is a moving object, stationary object, or flying object.

In one embodiment of the vehicle/object 300, multiple expandable pads $302_1$ to $302_j$ and multiple multilayer airbags $303_1$ to $303_k$ are mounted on all external sides of vehicle/object 300 and provide protection for impacts due to external objects at any external side of vehicle/object 300.

In one embodiment of the vehicle/object 300, the expandable pads $302_1$ to $302_j$ and multilayer airbags $303_1$ to $303_k$ are mounted on the main body frame of the vehicle/object 300 to provide a firm and strong support.

In one embodiment of the vehicle/object 300, by activating expandable pads $302_1$ to $302_j$ and/or multilayer airbags $303_1$ to $303_k$ the impact force to vehicle/object 300 will be lowered by absorption or diffraction and provides more protection to the passengers of vehicle/object 300.

In one embodiment of the vehicle/object 300, one or more of the multilayer airbags $303_1$ to $303_k$ at one or multiple sides of the vehicle/object 300 can be inflated to protect the external of vehicle/object 300 from fall, crash or impact with an external object.

In one embodiment of the vehicle/object 300, one or more of the expandable pads $302_1$ to $302_j$ at one or multiple sides of the vehicle/object 300 can be activated by applying voltage to two ends of expandable pad to protect the external of vehicle/object 300 from fall, crash or impact with an external object.

In one embodiment of the vehicle/object 300, controller 304 resets, and configures itself based on configuration data stored in its memory and then starts to execute artificial intelligence executable software which controls all aspects of navigation and protection of the vehicle/object 300 using an information data provided by sensors $301_1$ to $301_i$.

In one embodiment of the vehicle/object 300, multiple sensors 301 to $301_i$ are distributed at various locations internal and external to vehicle/object 300 and each has a unique IP address which is used to communicate with the controller 304 and avoid collision or confusion of the information data received by the controller 304 from the sensors internal or external to the vehicle/object 300.

In one embodiment of the vehicle/object 300, the sensors $301_1$ to $301_i$ can be at least one of image sensor, wireless sensor, radar, heat sensor, speed sensor, acceleration sensor, ultrasonic sensor, proximity sensor, pressure sensor, G (gravity) sensor, and IR (infrared) sensor.

In one embodiment of the vehicle/object 300, a wireless sensor transmits a coded signal similar to a unique identity code signal or a unique IP address signal and receives a reflected signal of the unique identity code signal, or the unique IP address signal from objects in surrounding environment of the vehicle/object 300 to avoid collision.

In another embodiment of the vehicle/object 300, the wireless sensor uses the reflected signal of the unique identity code signal or the unique IP address signal from objects in surrounding environment of the vehicle/object 300 to estimate and calculate a distance and an approaching speed of an object in the surrounding environment of the vehicle/object 300.

In another embodiment, the wireless sensor uses one IP address for communicating with controller 304 and a second IP address for transmitting a unique IP address signal over the air.

In another embodiment, the wireless sensor uses a single IP4 or IP6 address for communicating with controller 304 and transmit signal over the air.

In one embodiment of the vehicle/object 300, the wireless sensor, over the air, communicates with cellular network (5G and beyond) or private networks to obtain an information about objects in its surrounding environment.

In one embodiment of the vehicle/object 300, the wireless sensor supports IEEE1588 to synchronize with cellular base station (5G and beyond) or private network (also supports IEEE1588) and obtain time of the day.

In one embodiment of the vehicle/object 300, in order to avoid collision, cellular or private wireless networks broadcasts to the wireless sensor the absolute time when it can transmit a unique IP address signal and receive the reflected unique IP address signal from various objects in the surrounding environment to measure a distance and an approaching speed of various objects.

In one embodiment of the vehicle/object 300, in order to avoid collision, cellular or private wireless networks broadcast to the wireless sensor an absolute time when it can broadcast its information.

In another embodiment of the vehicle/object 300, the wireless sensor, over the air, broadcasts information that includes a time stamp indicating time of the day, type of the vehicle/object 300, location (obtained from GPS receiver), the identity number or IP address of the vehicle/object 300, signal propagation time through transmitter of the wireless sensor up to the input of transmit antenna, and estimated mass of the vehicle/object 300.

In one embodiment of the vehicle/object 300, two or more type of sensors can be used to better monitor the surrounding environment of the vehicle/object 300 and calculate and estimate parameters of the surrounding environment.

In one embodiment of the vehicle/object 300, an image sensor is used to monitor the vehicle/object 300 surrounding environment, and independently calculate and estimate a distance and an approaching speed of an object in its surrounding environment.

In one embodiment of the vehicle/object 300, an image sensor is calibrated for distance and a distance calibration matrix is stored in its memory.

In one embodiment of the vehicle/object 300, a wireless sensor with IP address and an image sensor with IP address are used to monitor the vehicle/object 300 surrounding environment, independently calculate and estimate a distance and an approaching speed of objects in the surrounding environment and use the information data to make a better decision to activate a multilayer air bag and/or an expandable pad.

In another embodiment, the vehicle/object 300 can be an automobile, a robot, a flying car, a small plane, a drone, a glider, a human or any flying and moving vehicle/device/object/equipment.

Figure 5:
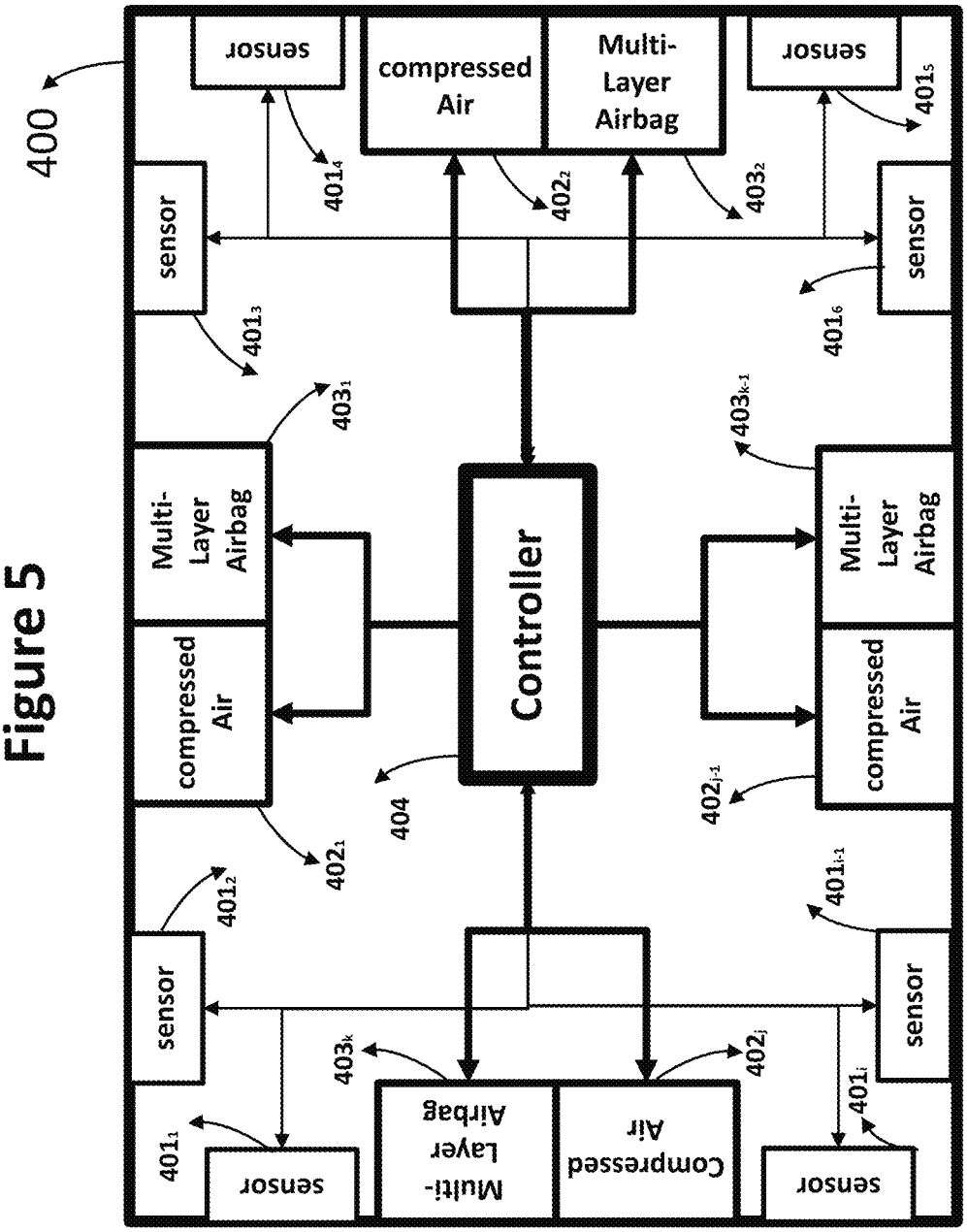
FIG. 5 depicts a moving or flying vehicles/objects using compressed air and multilayer airbag for protection

FIG. 5 illustrates an embodiment of a flying object 400. In general, the flying object 400 provides protection by releasing compressed air and/or inflating a multilayer airbag. The controller 404 receives information data related to operation status and surrounding environment of the flying object 400 from sensors $401_1$ to $401_i$ to detect any malfunction of the flying object 400 that results in loss of altitude, vertical fall due to gravity force and eventual crash to the ground. When controller 404 detects a fall through its controller 404 artificial intelligence which analyses the information data received from sensors $401_1$ to $401_i$ which include information data related to devices internal to flying object 400 and its surrounding environment's parameters, it activates at least one of the compressed air $402_1$ to $402_j$ to release air to slow down the fall at certain distance from ground before the flying object 400 crashes and then activates one or more of the multilayer airbag $403_1$ to $403_k$ for smoother landing or crash.

Flying object 400 includes, among other things, sensors $401_1$ to $401_i$, controller 404, compressed air units $402_1$ to $402_j$, and multilayer airbags $403_1$ to $403_k$.

In one embodiment of flying object 400, a subset of compressed air units $402_1$ to $402_j$ and multilayer airbags $403_1$ to $403_k$ allow for smoother crash or landing on any side of the flying object 400.

In one embodiment, flying object 400 uses a centralized compressed air unit with multiple outlets at different sides of the flying object and when activated the air is released only from the outlets on the side that flying object 400 lands or crash to the ground.

In one embodiment of flying object 400, one or more of the multilayer airbags $403_1$ to $403_k$ at one or multiple sides of the flying object 400 is inflated to make the crash or landing as smooth as possible.

In one embodiment of flying object 400, controller 404 resets, and configures itself based on a configuration data stored in its memory and then starts executing an artificial intelligence software which controls all aspects of navigation and protection of the flying object 400 using information data provided by sensors $401_1$ to $401_i$.

In one embodiment of flying object 400, each sensor has an IP address which is used to communicate with the controller 404 similar to an IP network to avoid collision or confusion of the information data received by the controller from sensors internal or external to the flying object.

In one embodiment of flying object 400, each sensor sends its information data to the controller 404 by using wireless and/or wired communication.

In one embodiment of flying object 400, the sensors $401_1$ to $401_i$ can be at least one of image sensor, wireless sensor, radar, heat sensor, speed sensor, acceleration sensor, ultrasonic sensor, proximity sensor, pressure sensor, G sensor, and IR (infrared) sensor.

In another embodiment, the flying object 400 can be a drone, a flying car, a small plane, a glider, and a flying human or robot.

Figure 6:
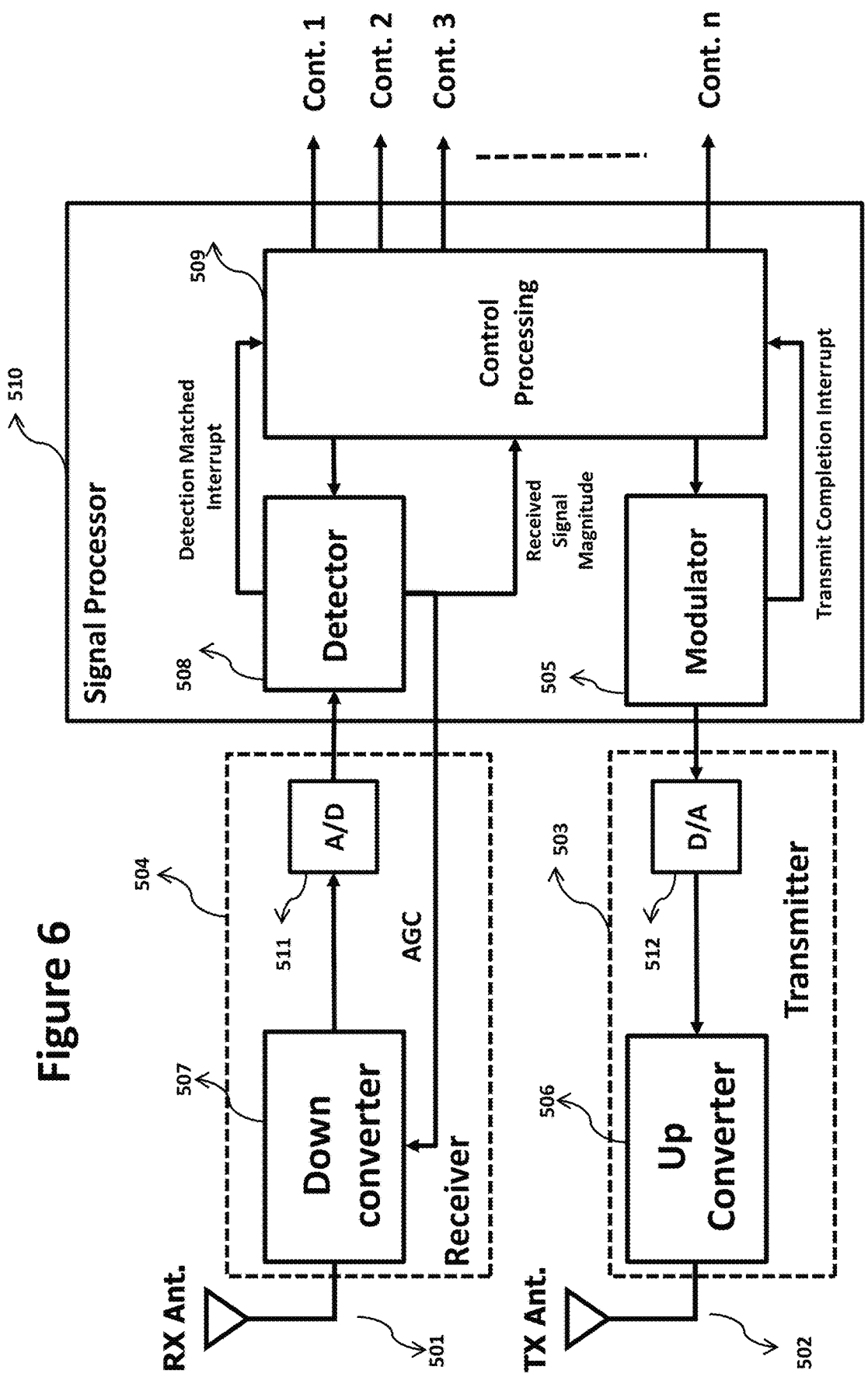
FIG. 6 illustrates an embodiment of a wireless sensing system

FIG. 6 depicts an embodiment of wireless sensor system 500. In general, wireless sensor system 500 facilitates estimation and calculation of certain parameters by transmitting a coded signal like an IP address signal generated or selected by a control processor 509 through a modulator 505, a transmitter 503 and antenna 502 and then receiving the attenuated version of reflected coded signal by an antenna 501, receiver 504 and detector 508. For example, control processor 509 select and IP address pattern from a pool of IP address, send it to modulator 505 for modulation then the modulated signal is sent to transmitter 503 to be converted to analog signal by digital-to-analog (D/A) converter 512 and up converted to carrier frequency by up convertor 506 for transmission through antenna 502. The modulator 505 also sends the time of completion of modulation to control processor 509. Then the reflected transmit signal from an object in the environment is received by antenna 501 and receiver 504, where it is down converted by down convertor 507 and converted to digital signal by analog-to-digital (A/D) converter 511. The digitized received signal is processed in signal processing unit 510, where it is detected by detector 508 and detection time is sent to control processor 509. The digitized down converted received signal also facilitates measurement of received signal strength intensity (RSSI) to provide to control processor 509.

Wireless sensor system 500 includes, among other things, signal processor 510, transmitter 503, transmit antenna 502, receive antenna 501, and receiver 504.

In one embodiment, signal processor 510, transmit antenna 502, transmitter 503, receive antenna 501, and receiver 504 are components of wireless sensor system 500 that could be used for various applications. For example, it can be used to communicate with cellular network (5G and beyond), a private network, a WiFi network, for broadcasting, communication with the cloud, and etc.

In one embodiment, wireless sensor system 500 receives information about its surrounding environment that includes various objects and their types from cellular network (5G and beyond), WiFi network or a private network. Wireless sensor system 500 also receives an IP address to use for its operation or a pool of IP addresses it can store and use as needed.

In another embodiment, wireless sensor system 500 uses GPS to obtain time of the day and clock synchronization.

In one embodiment, wireless sensor system 500 uses IEEE1588 and through cellular network (5G and beyond), WiFi network or a private network obtains time of the day and clock synchronization.

In another embodiment, wireless sensor system 500 receives the absolute time for its activity such as transmission, reception, communication and broadcasting from cellular network (5G and beyond), WiFi network or a private network.

In one embodiment, wireless sensor system 500 communicates its information and parameters to cellular network (5G and beyond), WiFi network or a private network.

In one embodiment, wireless sensor system 500 receives an information from its surrounding environment which is updated in real time from cellular network (5G and beyond), WiFi network or a private network.

In one embodiment, wireless sensor system 500 broadcast its information to other wireless sensors that belong to various moving or stationary objects in its surrounding environment.

In another embodiment, wireless sensor system 500 fragments its transmit signal to two or more fragment signals and transmit each fragment signal and receive the reflection of each fragment signal before transmission and reception of next fragment signal.

In one embodiment, signal processor 510 that processes both transmit and receive signal comprises of control processor 509, modulator 505, and detector 508.

Signal processor 510 processes an information transmitted from transmitter 503 through antenna 502 and an information received from receiver 504 through receive antenna 501. The signal processor 510 also provides gain control signal for receiver and facilitates change of transceiver operating frequency and modulation. Signal processor 510 typically utilizes appropriate hardware and software algorithm to properly process the information.

Wireless sensor system 500 can be any wireless transceiver that is able to wirelessly transmit communication signals. Wireless sensor system 500 is disposed on any physical platform that is conductive to effectively transmit the signals.

In one embodiment, communications through wireless system 500 are by a transmit antenna 502 and a received antenna 501. Transmit and receive antennas are physically separated to provide sufficient isolation between transmit and receive antennas. The transmit antenna 502 and the received antenna 501 can also be common or one antenna.

In one embodiment, communication through wireless system 500 is by a single antenna. In general at any specified period of time the antenna is selected by a switch and/or a circulator.

Signal Processor 510 has a variety of functions. In general, signal processor 510 is utilized for signal processing, calculation, estimation, activities, methods, procedures, and tools that pertain to the operation, administration, maintenance, and provisioning of wireless sensor 500. In one embodiment, signal processor 510 includes a database that is used for various applications. The database can be utilized for analyzing statistics in real-time.

Signal processor 510 also has a variety of thresholds. In general, signal processor 510 provides controls to various components that are connected to it. Moreover, signal processor 510 is a high capacity communication facility that connects primary nodes.

In one embodiment the wireless sensors system 500 uses microwave, or mili-metric wave transceiver.

In one embodiment, wireless sensor system 500 is controlled by control processor 509. The control processor 509 controls a transmit signal duration and number of times the transmit signal is transmitted by wireless sensor system 500. Control processor 509 also coordinates the transmit time and receive time period for the wireless sensors 500.

In one embodiment the wireless sensor system 500 can be used for body armors, automobile, robots, drone, and any other stationary and moving equipment.

Figure 7A:
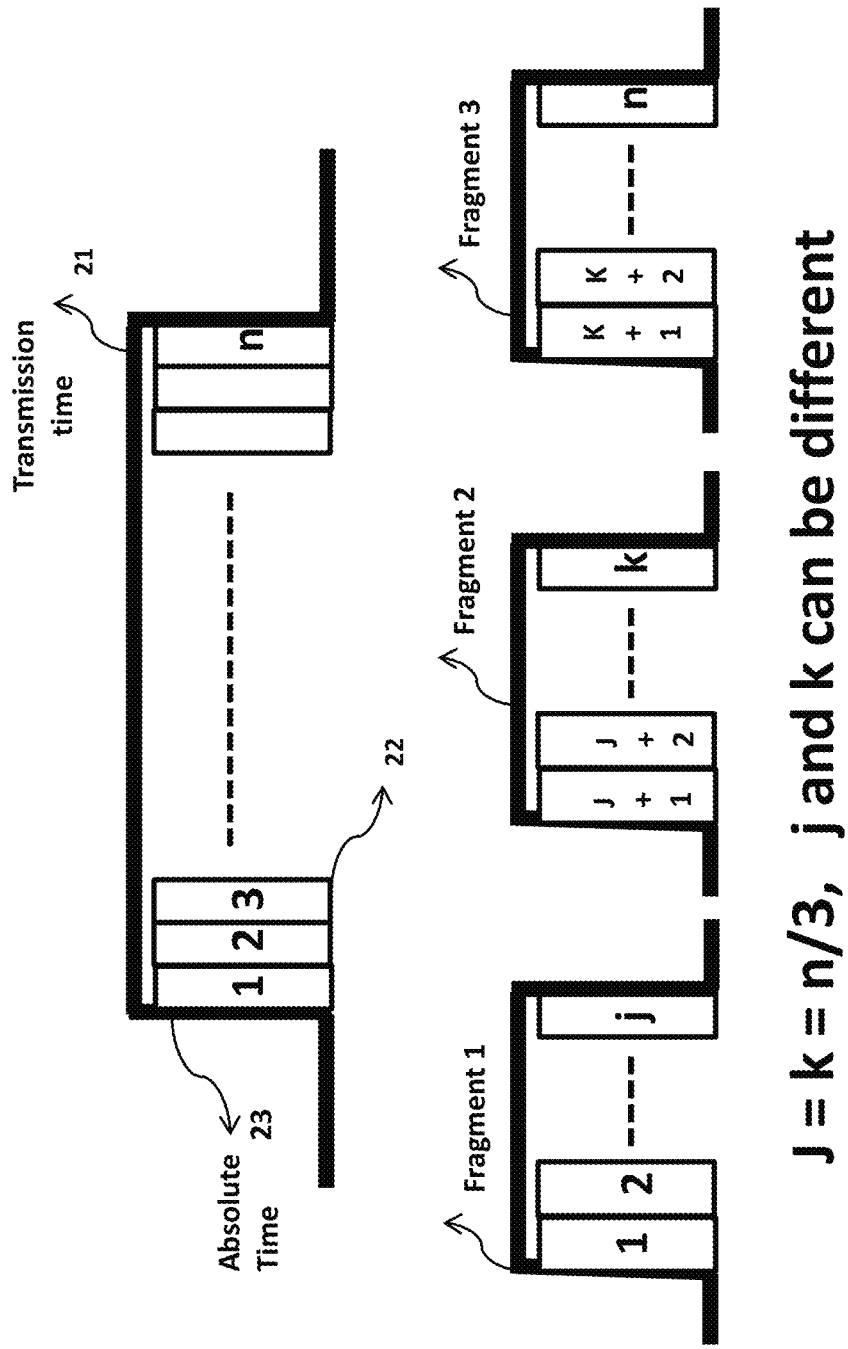

FIG. 7*a* depicts an embodiment of wireless sensor system 500 (defined in FIG. 6) transmit signal. The transmit signal has a transmission time (duration) 21 and a bit pattern 22. Pattern 22 can be a unique identity code, an IP address, or a random pattern which is generated by a control processor.

In one embodiment of wireless sensor system 500 used in a protection system of a moving or flying vehicle/object defined in FIGS. 4 and 5, the pattern 22 is assigned to wireless sensor system 500 at manufacturing.

In one embodiment of wireless sensor system 500, the random pattern 22 may be changed after being used a few times based on the artificial intelligence in the controller which evaluate the receive signal information data from wireless sensor system 500. The change of transmit pattern 22 signal is for avoiding any collision or false detection from other signals in the surrounding environment.

In one embodiment of wireless sensor system 500 the transmit signal 22 is an IP address (or identity code) unique to the protection system using the wireless sensor 500. The IP address (or identity code) can be assign to wireless system 500 at manufacturing. The IP address (or identity code) can also be assign to wireless sensor system 500 on the field by user. The IP address can be assigned each time the wireless sensor system 500 is turned on the same way that an Internet of things (IoT) device receives its IP address. The IP address (or identity code) can also be taken from a pool of IP addresses (or identity codes) stored in the control processor memory or a removable memory card which can be similar to a subscriber identity module (SIM) card.

In one embodiment of wireless sensor 500, the transmit pattern duration 21 depends on the number of bit pulses in the transmit signal pattern and transmit signal duration depends on carrier frequency, bandwidth, and modulation level of wireless sensor 500. The higher the number of bits in transmits identity code, IP address, or random pattern the longer the transmit signal duration.

In one embodiment of wireless sensor 500, the number of bits in the pattern 22 defines the accuracy of the receiver detection.

In another embodiment, the transmit bit pattern 22 is fragmented to smaller bit patterns, shown in FIG. 7*a*, to allow use of lower carrier frequency, less bandwidth, or lower level modulation for wireless sensor 500.

In one embodiment, wireless sensor system 500 transmits the first fragment with "j" bits, receives the reflected transmit signal from objects in surrounding environment of wireless sensor system 500, then transmit the second fragment with "k-j" bits, and finally wireless sensor system 500 transmits the last fragment with "n-j-k" bits and receives the reflected transmit signal from objects in surrounding environment of wireless sensor system 500 for detection of the transmit bit pattern.

In another embodiment, the fragment bit patterns can have equal number of bits, or different number of bits.

In one embodiment of wireless sensor system 500, the start of transmission time 21 or start of first bit in bit pattern 22 is an absolute time 23 that is configured in the wireless sensor system 500. This absolute time is derived from time of the day wireless sensor system 500 obtains from GPS receiver, cellular network (5G and beyond), WiFi network or a private network. The absolute time can also be sent to wireless sensor 500 by a cellular network (5G and beyond), WiFi network or a private network. The absolute time can be first microsecond in a millisecond, or the nth microsecond after the start of a millisecond.

In one embodiment, the absolute time can be any nanosecond within a microsecond period, such as $1^{st}$ nanosecond, kth nanosecond, nth nanosecond, and etc.

In one embodiment of wireless sensor 500, the time of the day obtained from GPS receiver or IEEE1588 through a base station 208 supporting a cellular network (5G and beyond), a WiFi network or a private network has accuracy within fraction of nanosecond or fraction of nanosecond In one embodiment the time of the day obtained from GPS receiver or IEEE1588 through a base station 208 (FIG. 3) supporting a cellular network (5G and beyond), a WiFi network or a private network is based on Coordinated Universal Time (UTC).

In another embodiment, the broadcast absolute time for wireless sensor 500 used in the smart environment 100 and 200 defined in FIGS. 2 and 3 avoids any collision when wireless sensors from various objects broadcast their information in the smart environment 100 and 200.

Figure 7B:
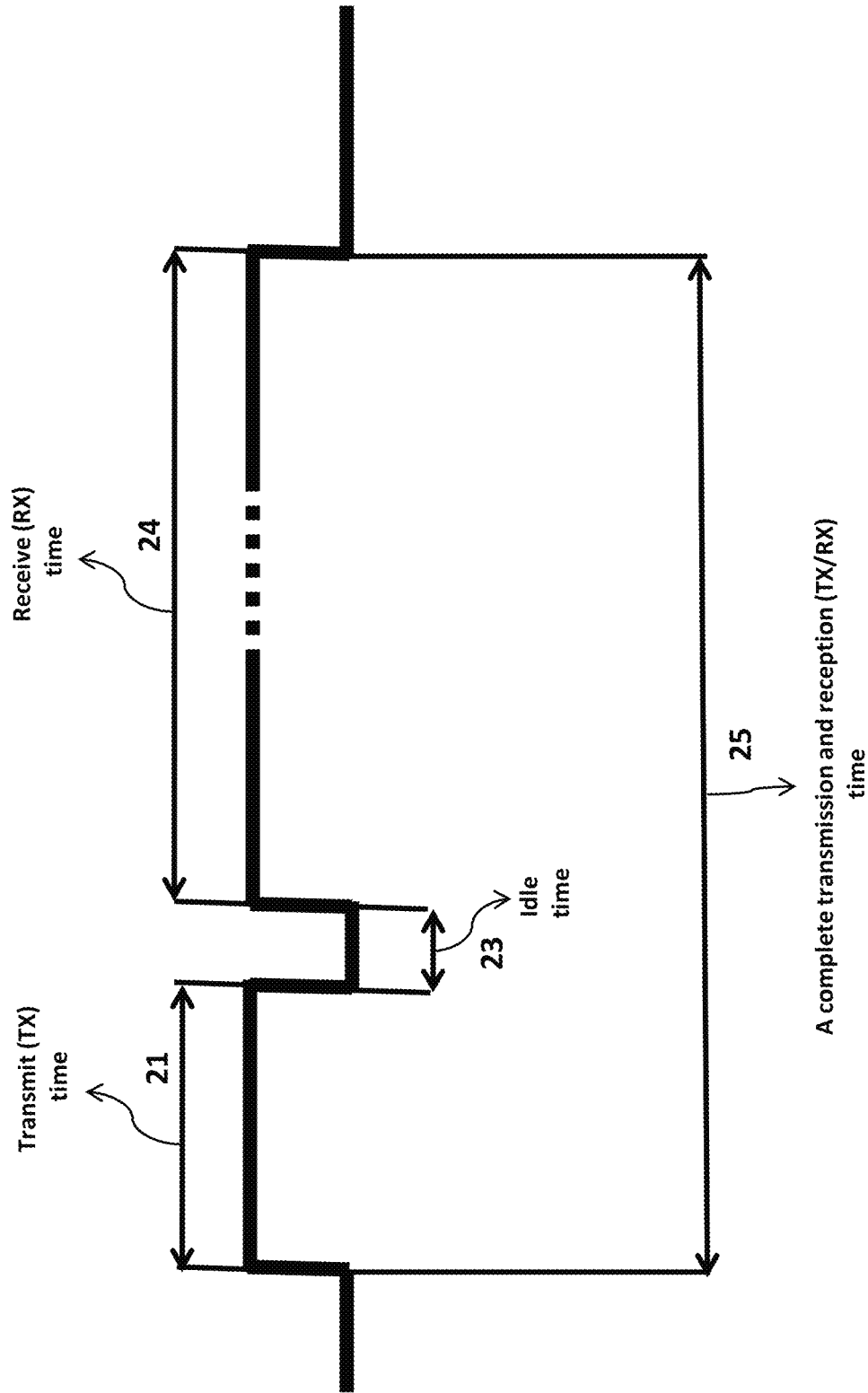

FIG. 7*b* shows the duration of a complete single transmission and reception (single measurement time) 25 for wireless sensor system 500. The complete transmission and reception duration comprises of the transmit time (duration) 21, idle time 23 and receive duration 24.

In one embodiment of wireless sensor system 500, the idle time 23 can be zero. The idle time can vary based on proximity of an object to wireless sensor system 500 in its surrounding environment. The closer the object the smaller the idle time 23 is.

In one embodiment of wireless sensor system 500, the reception time 24 depends on the monitoring radius of surrounding environment of the wireless sensor system 500. The bigger the radius of monitoring the longer the reception time of wireless sensor system 500 is.

Figure 7C:
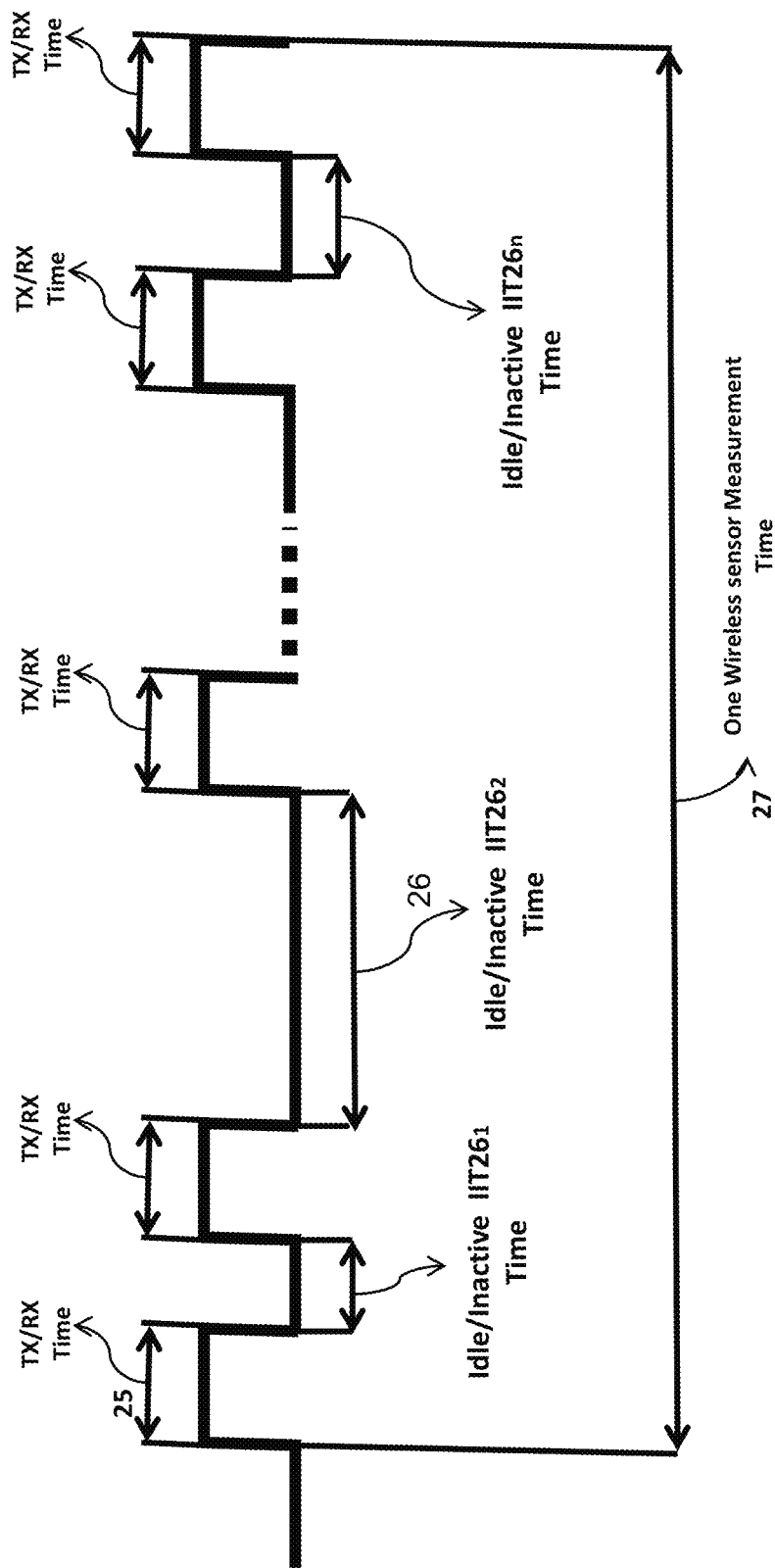

FIG. 7*c* shows the duration of a complete measurement time 27 of wireless sensor system 500. It comprises of "n+1" single complete transmission and reception (single measurement) times 25 and the idle/inactive times $IIT26_1$ to $IIT26_n$ between single complete transmission and reception (single measurement) times.

In one embodiment of wireless sensor system 500, idle/inactive times $IIT26_1$ to $IIT26_n$ can have the same duration or randomly different duration based on artificial intelligence assessments. Artificial intelligence within wireless sensor system 500 control processor defines the idle/inactive time duration to avoid any reception collision with transmit signals from other devices in the surrounding environment of the wireless sensor system 500.

In one embodiment of wireless sensor system 500, the artificial intelligence within the control processor of wireless sensor system 500 can use a number of measurement times 27 for assessment of the surrounding environment before deciding to activate any function or devices.

FIG. 7*d* depict the duration of a complete measurement time 27 and communication/broadcasting/monitoring time 29 of wireless sensor system 500.

In one embodiment, the communication time, broadcast time and monitoring time of wireless sensor system 500 are all achieved during time 28 assigned for this task.

In another embodiment, wireless sensor system 500 only communicates with a cellular network (5G and beyond), a WiFi network or a private network during time 28.

In another embodiment, wireless sensor system 500 performs only over the air broadcasting task during time 28.

In one embodiment, wireless sensor system 500 performs only monitoring of broadcast information from other objects in its surrounding environment during time 28.

In another embodiment, wireless sensor system 500 performs two of three tasks (communication, broadcast, monitor) during time 28.

Figure 7E:
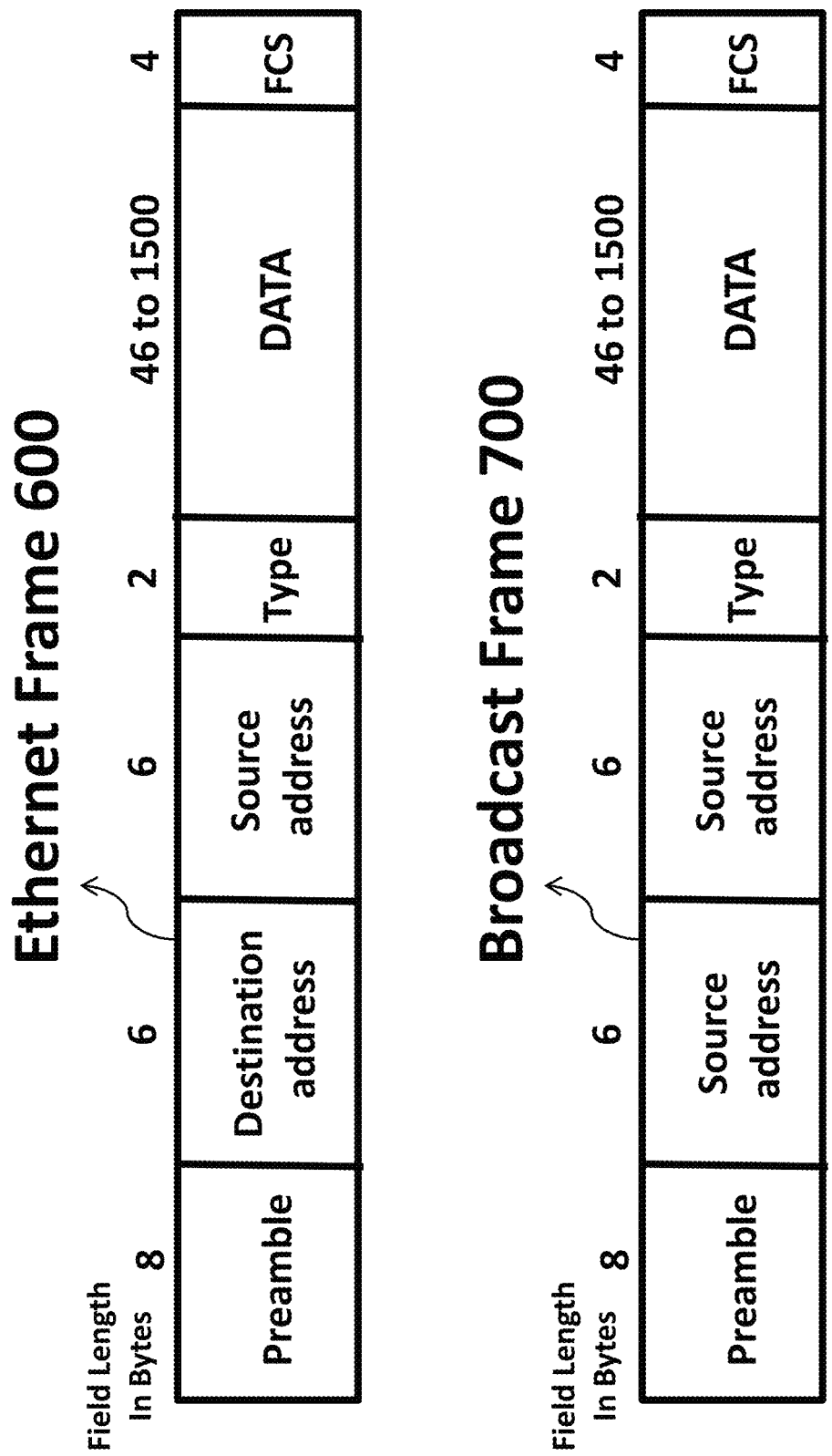

FIG. 7e depicts a broadcast frame 700 for wireless sensor system 500.

In one embodiment the broadcast frame 700 uses similar structure as Ethernet frame 600.

In one embodiment the broadcast frame 700 instead of destination address uses source address.

In another embodiment the source address of the broadcast frame 700 is the identity code, or IP address of wireless sensor system 500.

Figure 8:
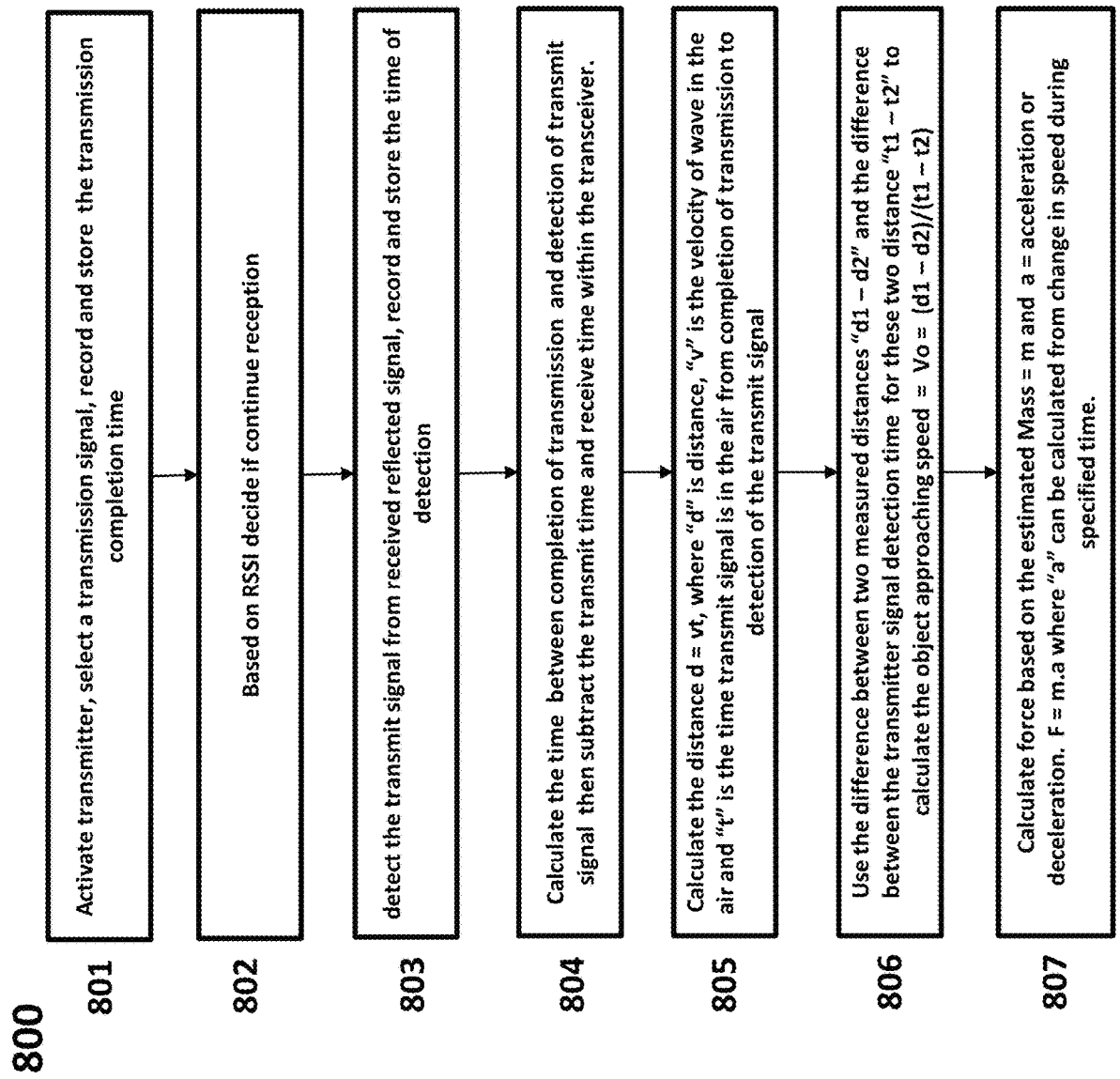
FIG. 8 depicts the process steps to calculate environmental parameters

FIG. 8 depicts an embodiment of method 800 for using a wireless sensor system 500 to estimate and calculate environmental parameters. In various embodiments, method 800 is carried out by processor and electrical circuit under the control of a processes or executable instructions. The readable and executable instructions reside, for example, in a data storage medium such as processor usable volatile and non-volatile memory. However, the readable and executable instructions may reside in any type of processor readable storage medium. In some embodiments, method 800 is performed at least by one of the circuits described herein.

At 801 of method 800, the transmitter is activated, a transmit signal is generated, the transmit signal is transmitted and a timing counter is initiated. For example, transmit signal is generated in control processor 509 and then is modulated in modulator 505 and up converted to radio frequency in transmitter 503 before being transmitted by transmit antenna 502. A time of completion of transmission is recorded and stored in control processor 509.

At 802 of method 800, after completion of transmission the receiver 504 is activated, the receiver 504 starts measurement of RSSI, compare it with pre-configured threshold, and the control processor 509 decides whether to continue with reception.

At 803 of method 800, the reflected transmit signal is detected in detector 508 and the detection time is recorded and stored in control processor 509.

At 804 of method 800, the traveling time of the transmit signal from transmit antenna 502, reflected from an object in the environment, and received at receive antenna 501 is calculated. This is done by calculating the time between completion of transmission's time and the time detection of reflected transmit signal is completed. In the calculation the propagation time in the transmitter path and receiver path is taken into account.

At 805 of method 800, the control processor calculates the distance between an external object and the receive antenna 101. This is done by the formula d=vt/2, where "d" is distance, "v" is the velocity of wave in the air and "t" is the time transmit signal is in the air from completion of transmission to detection of the transmit signal.

At 806 of method 800, the control processor calculates the speed of an external object approaching the receive antenna 101. This is done by using the difference between two measured distances "d1−d2" and the difference between the transmitter signal detection times for these two distances "t1−t2". Then the control processor 509 calculates the object approaching speed using formula Vo=(d1−d2)/(t1−t2) where Vo is the approaching speed of the external object.

At 807 of method 800, the control processor 509 calculates the force from an external object. Control processor 509 calculates force based on the estimated Mass=m of the object and "a"=acceleration or deceleration of external object by using formula F=m·a where "a" can be calculated from change in speed during specified time.

Figure 9:
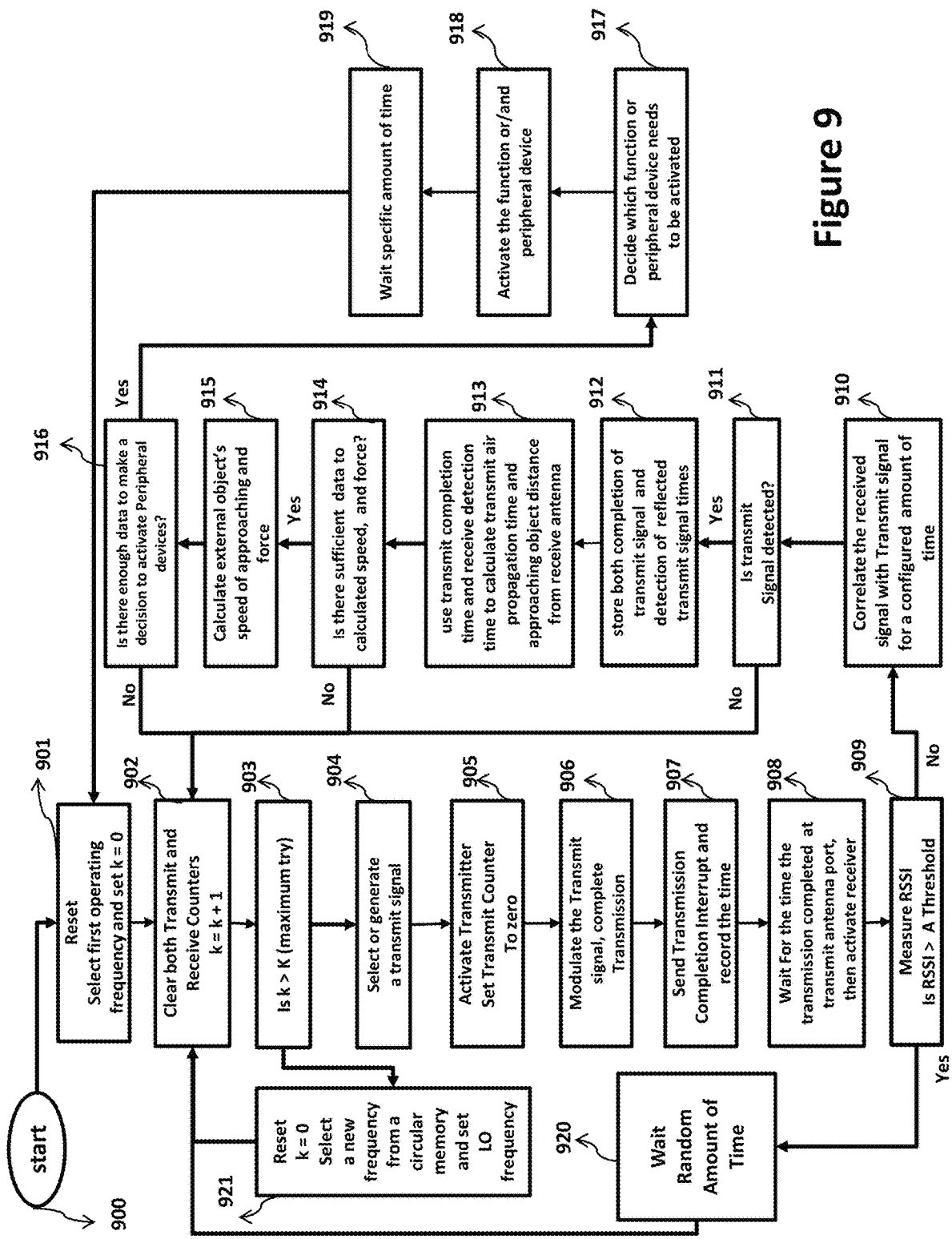
FIG. 9 shows an embodiment of wireless sensor control algorithm when more than one frequency is used for transmission and reception

FIG. 9 shows an embodiment of wireless sensor system control algorithm when multiple frequencies are used for transmission and reception.

The algorithm start at 900 is when the wireless sensor system is activated, powered on or resets.

At 901 the control processor resets and selects an operating frequency. Then it set k=0, where "k" is the number of times measurements are done with selected frequency. Maximum number of measurements with a selected frequency is "K".

At 902 the control processor 509 clears the transmitter and receiver counters and increment "k".

At 903 the control processor checks if "k" is greater than "K". If it is then continue at 921. If it is not proceeds to 904.

At 921 the control processor resets the wireless sensor system, select a new frequency from a circular memory, sets the local oscillator (LO) frequency, sets "k"=0 and proceeds to 902.

At 904 control processor select or generate a transmit signal and then proceeds at 905.

At 905 the transmitter is activated and the counter for transmitter is set to zero.

At 906 the transmit signal is modulated then up-converted to be transmitter by transmit antenna until the transmission is completed.

At 907 a transmission completion interrupt is sent to controller 509 and the time for transmission completion is recorded.

At 908 wait for the time the transmission completed at transmit antenna port, then activate receiver.

At 909 the received signal strength intensity (RSSI) is measured and then checked if the RSSI is greater than or equal to a threshold. If RSSI is greater than or equal to the threshold the process continues at 920. If RSSI is less than threshold the process continues at 910.

At 920 wait for a random amount of time and then continue at 902.

At 910 correlate the received signal with Transmit signal for a configured amount of time. The maximum correlation time is defined by the maximum distance from receive antenna that is being monitored.

At 911 check if the transmit signal is detected. If detected continue at 912 and if not continue at 902.

At 912 store time of completion of transmit signal transmission and time of detection of reflected transmit signal.

At 913 use transmit completion time and receive detection time to calculate transmit wave propagation time. Then use the propagation time to calculate the distance of the approaching object from receive antenna.

At 914 check if there is sufficient data to calculated speed. For calculating approaching speed of a particular object there is a need for at least two consecutive distance measurements.

At 915 calculate external object's approaching speed to receiver antenna by using two consecutive measured distances and the time of detection of transmit signal in these two measurements. The collision force due to a particular object is calculated using its approaching speed at the time of impact, its estimated mass and estimated time to decelerate.

At 916 check if there is enough data to make a decision to activate functions or peripheral devices. If there is enough data to make a decision continue at 917. If there is not enough data to make a decision continue at 902.

At 917 the control processor decides which function or device to activate and then proceed to 918.

At 918 the selected function or device is activated and proceeds to 919.

At 919 control processor stop processing for a defined amount of time. When the wait time finished then control processor proceeds to 901.

Range imaging is the name for a collection of techniques that are used to produce a 2D image showing the distance to points in a scene from a specific point, normally associated with some type of sensor device. The resulting image, the range image, has pixel values that correspond to the distance. If the sensor that is used to produce the range image is properly calibrated the pixel values can be given directly in physical units, such as meters.

Visual images are formed via the projection of light from the three-dimensional world onto a two dimensional sensor. In an idealized pinhole camera, all points lying on a ray passing through the pin-hole will be projected onto the same image position. Thus, information about the distance to objects in the scene (i.e., range) is lost. Distance information can be recovered by measuring the changes in the appearance of the world resulting from change in viewing position. Traditionally, this is accomplished via simultaneous measurements with two cameras at different positions, or via sequential measurements collected from a moving camera or object.

Three pillars of photography are Aperture, Shutter Speed and ISO. The camera's shutter speed, the lens's brightness (f-number), and the scene's luminance together determine the amount of light that reaches the sensor (the exposure). Exposure value (EV) is a quantity that accounts for the shutter speed and the f-number. Adjustment to the aperture controls the depth of field, the distance range over which objects are acceptably sharp; such adjustments need to be compensated by changes in the shutter speed.

In optics, the f-number (sometimes called focal ratio, or relative aperture) of an optical system is the ratio of the lens's focal length to the diameter of the entrance pupil.

Figure 10:
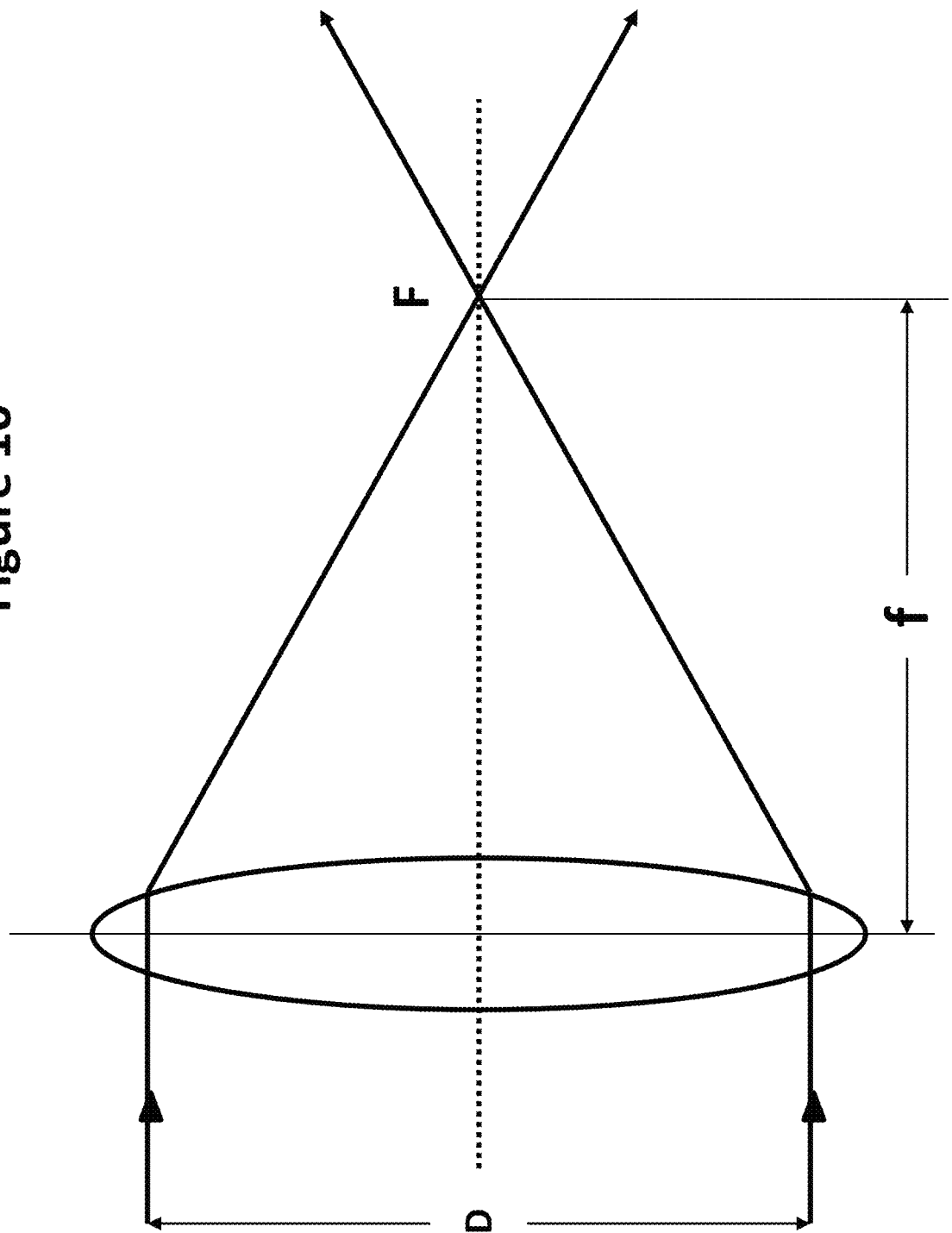
FIG. 10 shows the parameters of a lens

As shown in FIG. 10 the f-number N is given by:

$$N = \frac{f}{D}$$

where f is the focal length, and D is the diameter of the entrance pupil (effective aperture). It is customary to write f-numbers preceded by f/N, which forms a mathematical expression of the entrance pupil diameter in terms of f and N. For example, if a lens's focal length is 10 mm and its entrance pupil diameter is 5 mm, the f-number is 2 and the aperture diameter is f/2.

To maintain a consistent level of exposure, the shutter speed needs to be balanced with the aperture, and as one is increased, the other needs to decrease. For instance, smaller apertures (which let less light into the camera) require slower shutter speeds (to expose the sensor for longer). Wide apertures (more light) needs faster shutter speeds (less time) to produce the same exposure.

ISO stands for International Standards Organization, and it is a standardized industry scale for measuring sensitivity to light. This can be used in relation to how sensitive a sensor is to light, but more commonly today, it pertains to the sensitivity of a digital image sensor. ISO is measured in numbers, with the lowest number being the least sensitive to light, (e.g. ISO 50 or 100), and the highest number being the most sensitive to light, (e.g. ISO 6400). The higher the ISO the lower the amount of time a shutter needs to be open. Almost all digital cameras today allow you some control over your ISO settings, so it is important to know what it is, and what effect it has on your images.

The simplest formula to estimate distance to the object is pinhole projection formula:

$$\frac{x}{f} = \frac{X}{d}$$

Where x is the size of the object on the sensor, f is focal length of the lens, X is the size of the object, and d is distance from nodal point to the object. x and f, and X and d are measured in the same units, e.g. mm and m respectively. To calculate x one will need to estimate pixel size for the sensor; for example, for Pentax K20D it is 23.4 mm/4672 pixels≈5.008e-3 mm/pixel, i.e. a 100 pixels long image corresponds to x=500.08e-3 mm.

In the following, it is assumed that the size of the object (X) is unknown, and the only known parameters are x (image size) and f (focal length). The problem is that one cannot tell from one photo if a small object is very close to the camera or a big object far away, because the depth of field in landscape shots is usually very big (and that's why pinhole formula is applicable).

To solve this problem one may use two or more images to measure the distance. Provided one can measure all angles and distance between two camera positions, then it is possible to calculate distance to the remote object. But measuring all angles is not an easy task.

An easier approach is to take two photos which stay on the same line with the object, and the object in the center of the image. Let's assume the distance to the object on the first photo at time $t_0$ is $d_1$, and image size is $x_1$:

$$x_1/f = X/d_1 \quad (1)$$

Then if the image sensor moves towards the object with speed of "v", on the second photo after $t_1$ time passed, the image size is $x_2$ slightly bigger than $x_1$:

$$x_2/f = X/d_2 \quad (2)$$

From equations (1), and (2) one has;

$$x_1 * d_1 = x_2 * d_2 \quad (3)$$

In the case of stationary object, considering the speed that the sensor approaches the object one has;

$$d_1 - d_2 = v * t_1 \quad (4) \text{ therefore,}$$

$$x_1 * d_1 - x_2 * d_1 = -x_2 * v * t_1 \quad (5) \text{ or}$$

$$d_1 = x_2 * v * t_1 / (x_2 - x_1) \quad (6) \text{ and}$$

d2 can be obtain from equation (3).

If either the sensor or object or both are moving and we do not know the speed of neither of them, then we have two options;

1. use other means like GPS, speedometer (when mounted on automobiles, bicycles, motorbikes, etc.), wireless radio sensor, or other techniques (similar to what is used in helicopters, drone, airplane or etc.) to obtain the approaching speed of the object or
2. calibrate the image sensor for distance using a number of measurements and create a calibration matrix that relates the image size to distance of the object from the image sensor.

In the second approach, once Δd is estimated at two different times spaced by Δt, then Δd and Δt are used to calculate the speed. This speed can be used in equation 6 to recalculate distance.

Figure 11:
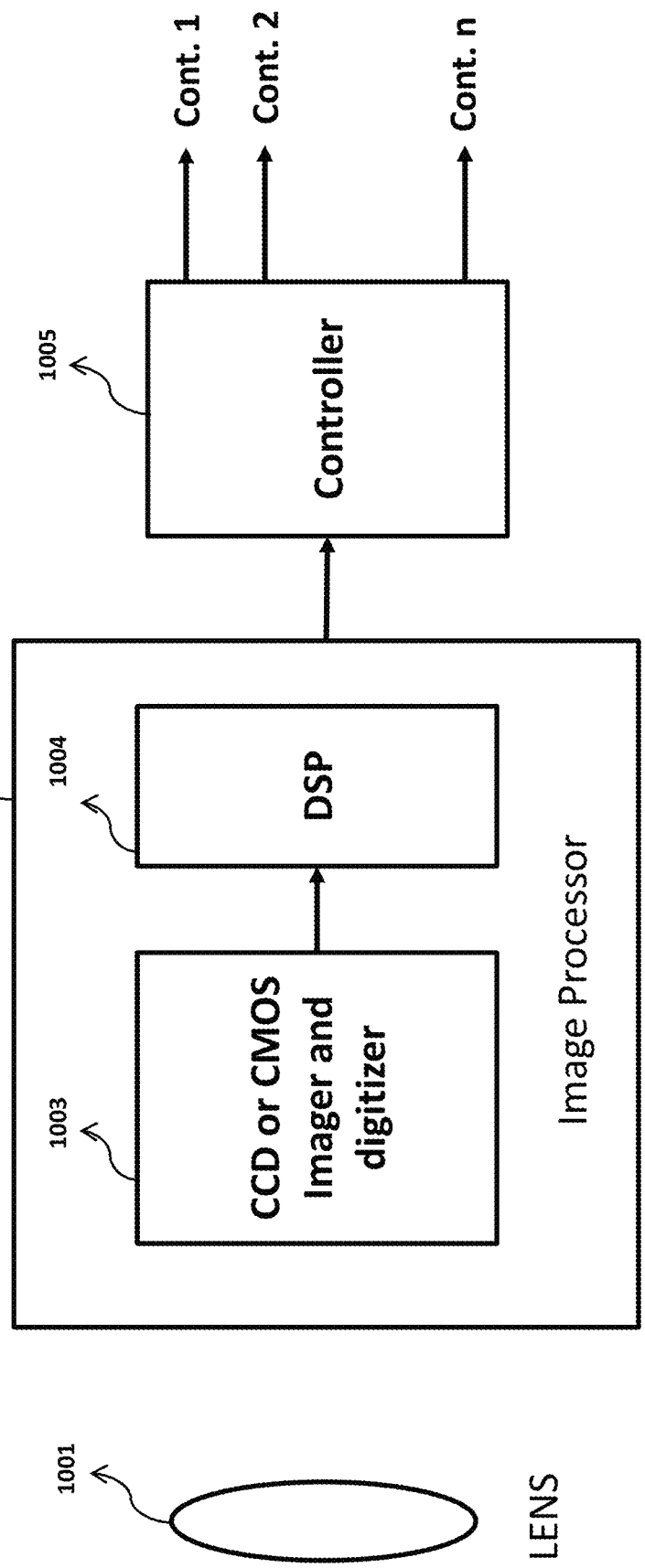
FIG. 11 shows an embodiment of an image sensor

FIG. 11 depicts an embodiment of image sensor 1000. In general, image sensor 1000 facilitates estimation and calculation of certain parameters of environment by using the images from the environment. The images are produced through a lens 1001 and an image processor 1002 which comprises of an imager/digitizer 1003 and a DSP (digital signal processor) 1004. The image is processed in DSP 1004 to identify an external object. Then through use of the pixels from multiple images and multiple lenses the approaching speed and distance of the object from image sensor are estimated. The speed and distance information is passed to a controller 1005 to decide what function or device has to be activated.

Image sensor system 1000 includes, among other things, control processor 1005, image processor 1002 and lens 1001.

In one embodiment, control processor 1005, image processor 1002 and lens 1001 are components of image sensor 1000 that could be used for various applications. For example, it can be used in robotics, guided systems, automated automobiles, helmets, body armor worn by human or robot, traffic monitoring, flying car, any equipment or device that allows a human or robot to fly from point "A" to point "B", and etc.

In one embodiment, image sensor 1000 is calibrated for distance. Calibration is achieved by using various objects with different and specific shapes at different known distances from image sensor 1000. The calibration information is used to create a distance calibration matrix and stored in the DSP 1004 or control processor 1005.

Control processor 1005 is for processing information data received from image processor 1002. Control processor 105 typically utilizes appropriate hardware and software algorithm to properly process the information data.

In one embodiment, a time for collecting image data in image sensor 1000 is defined by control processor 1005.

In one embodiment, the imager/digitizer of image sensor 1000 is of CCD or CMOS type.

In one embodiment, the image sensor uses the information from pixels that belong to an identified object produced from multiple imagers and lenses to estimate some parameters of the environment.

In one embodiment, the DSP 1004 has a variety of functions. In general, DSP 1004 and the distance calibration matrix are utilized for signal processing, calculation, estimation of environmental parameters.

Control Processor 1005 has a variety of functions. In general, control processor 1005 is utilized for activities, methods, procedures, and tools that pertain to the operation, administration, maintenance, and provisioning of image sensor. In one embodiment, control processor 1005 includes a database that is used for various applications. The database can be utilized for analyzing statistics in real-time.

Control processor 1005 also has a variety of thresholds, tables, calibration data and distance calibration matrix (measurement information, etc) stored in the control processor memory or a removable memory card which can be similar to a subscriber identity module (SIM) card. In general, control processor 1005 provides control to various functions and devices. Moreover, control processor 1005 is a high capacity communication facility that connects primary nodes.

In one embodiment, an image sensor 1000 can be worn by human and robots.

Figure 12:
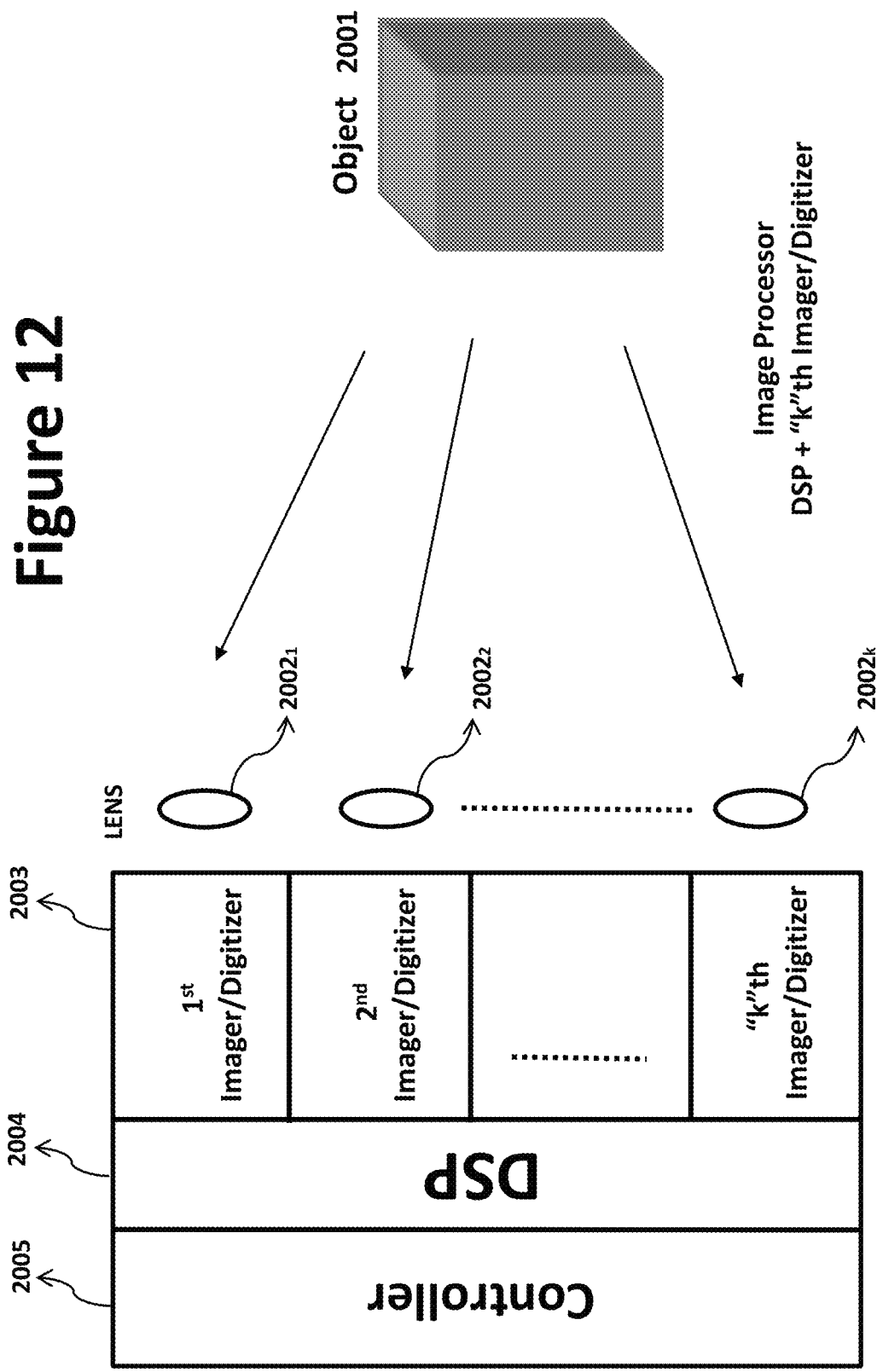
FIG. 12 shows an embodiment of image sensor interaction with an object in its surrounding environment

FIG. 12 depicts an embodiment of image sensor system 2000 interactions with one object in its surrounding environment. In general, image sensor system includes controller 2005, DSP 2004, "k" Imager/digitizer 2003, and lenses $2002_1$ to $2002_k$.

In another embodiment of image sensor system 2000 used by a moving or flying vehicle/object, is calibrated for distance using a number of measurements to create a distance calibration matrix that relates the image size to distance of the object from the image sensor.

Controller 2005 request information from one of imager/digitizers 2003 by sending an activation signal. The imager/digitizer receives the activation signal and record an image from external object 2001 in its surrounding environment.

In one embodiment of image sensor system 2000 used by a moving or flying vehicle/object, DSP 2004 processes the recorded images from a number of lenses in conjunction with the stored distance calibration matrix and extracts the needed information data to estimate the required parameters from object 2001 to send to controller 2005. The controller 2005 uses the information data received from DSP 2004 to decide which function or device needs to be activated.

In one embodiment of image sensor system 2000 used by a moving or flying vehicle/object, the image sensor's distance calibration matrix and pixels in the object's image are used to estimate and calculate a distance of the object in surrounding environment from image sensor and an approaching speed of the object towards image sensor.

Figure 13:
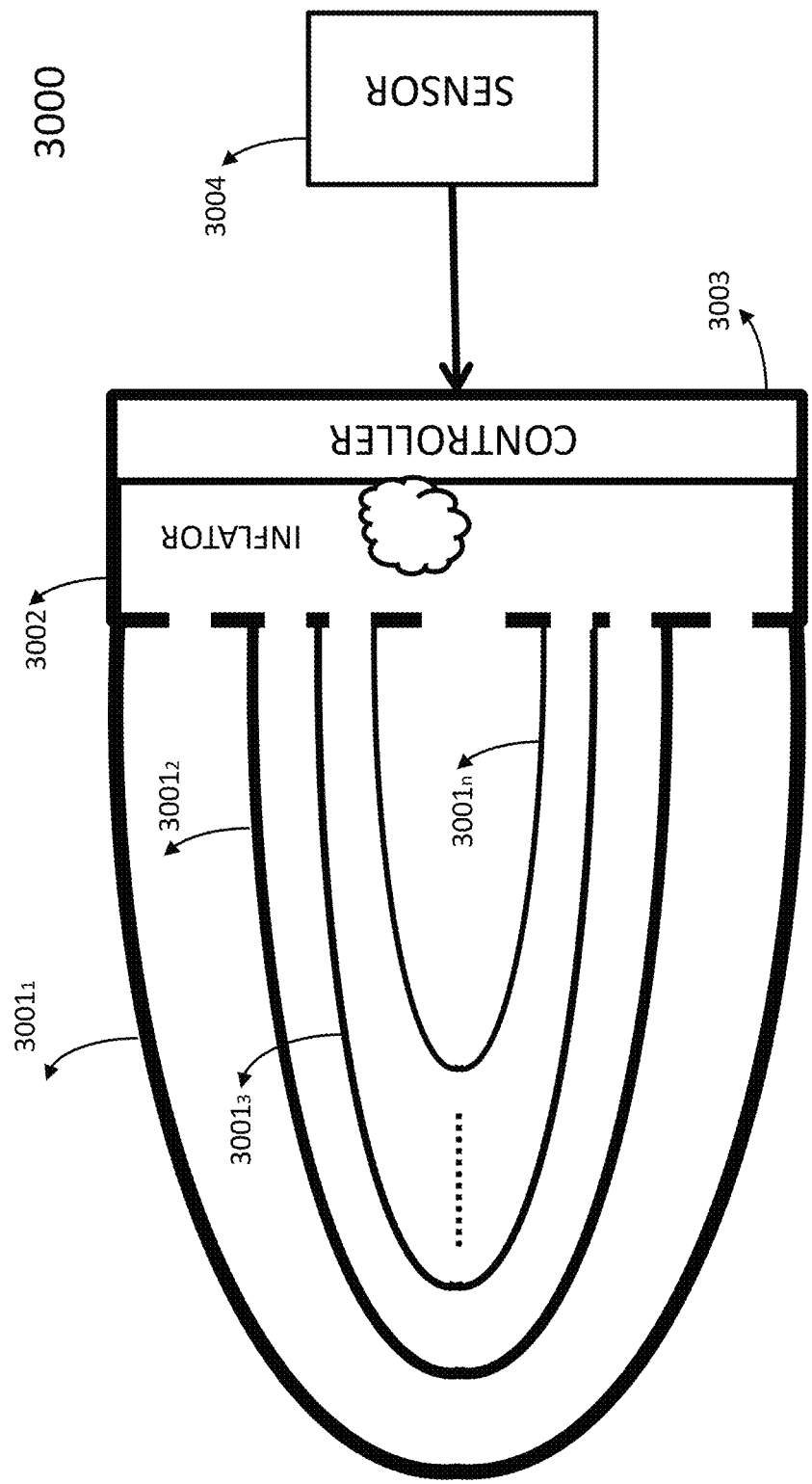
FIG. 13 shows a multilayer airbag system

FIG. 13 illustrates an embodiment of a multilayer airbag 3000. In general, the multilayer airbag 3000 provides protection by inflating "n" airbags that are within one another (nested airbag). When sensor 3004 detects an approaching object to the multilayer airbag protection system, it sends a detection information data to the controller 3003. The controller 3003 based on the detection information data and other available data decides to activate the inflator 3002 to inflate airbags $3001_1$ to $3001_n$.

Multilayer airbag 3000 includes, among other things, sensor 3004, controller 3003, inflator 3002, and "n" airbags $3001_1$ to $3001_n$ that are within each other (nested).

In one embodiment, the sensor 3004 can be at least one of image sensor, wireless sensor, radar, heat sensor, speed sensor, acceleration sensor, ultrasonic sensor, proximity sensor, pressure sensor, G sensor, and IR (infrared) sensor.

In one embodiment of multilayer airbag 3000, the controller 3003 provides the firing driver for the inflator 3002 gas generator, monitors operation of the multilayer airbag, and indicates any malfunction.

In one embodiment of multilayer airbag 3000, the inflator 3002 inflates multilayer airbag $3001_1$ to $3001_n$ based on the activation it receives from controller 3003 by producing a large pulse of hot nitrogen gas.

In one embodiment of multilayer airbag 3000, the airbag $3001_2$ resides inside airbag $3001_1$, the airbag $3001_3$ resides inside airbag $3001_2$, and ultimately airbag $3001_n$ resides inside airbag $3001_{n-1}$.

In one embodiment of multilayer airbag 3000, the airbag $3001_2$ inflates within airbag $3001_1$, the airbag $3001_3$ inflates within airbag $3001_2$, and ultimately airbag $3001_n$ inflates within airbag $3001_{n-1}$.

In one embodiment of the multilayer 3000, airbag $3001_1$ to $3001_n$ provide "n" layer of redundancy.

In one embodiment of multilayer airbag 3000, the controller 3003 activates the inflator 3002 based on at least one of the information it receives from the sensor 3004, the central brain or artificial intelligence (AI) of the moving or flying vehicle/object that uses multilayer airbag 3000, and other entities (for example an operating person).

In one embodiment of multilayer airbag 3000, the controller 3003 acts as the main brain or artificial intelligence and activates the inflator 3002 based on the information it receives from the sensor 3004 and other sensors of the moving or flying vehicle/object that uses multilayer airbag 3000.

Figure 14A:
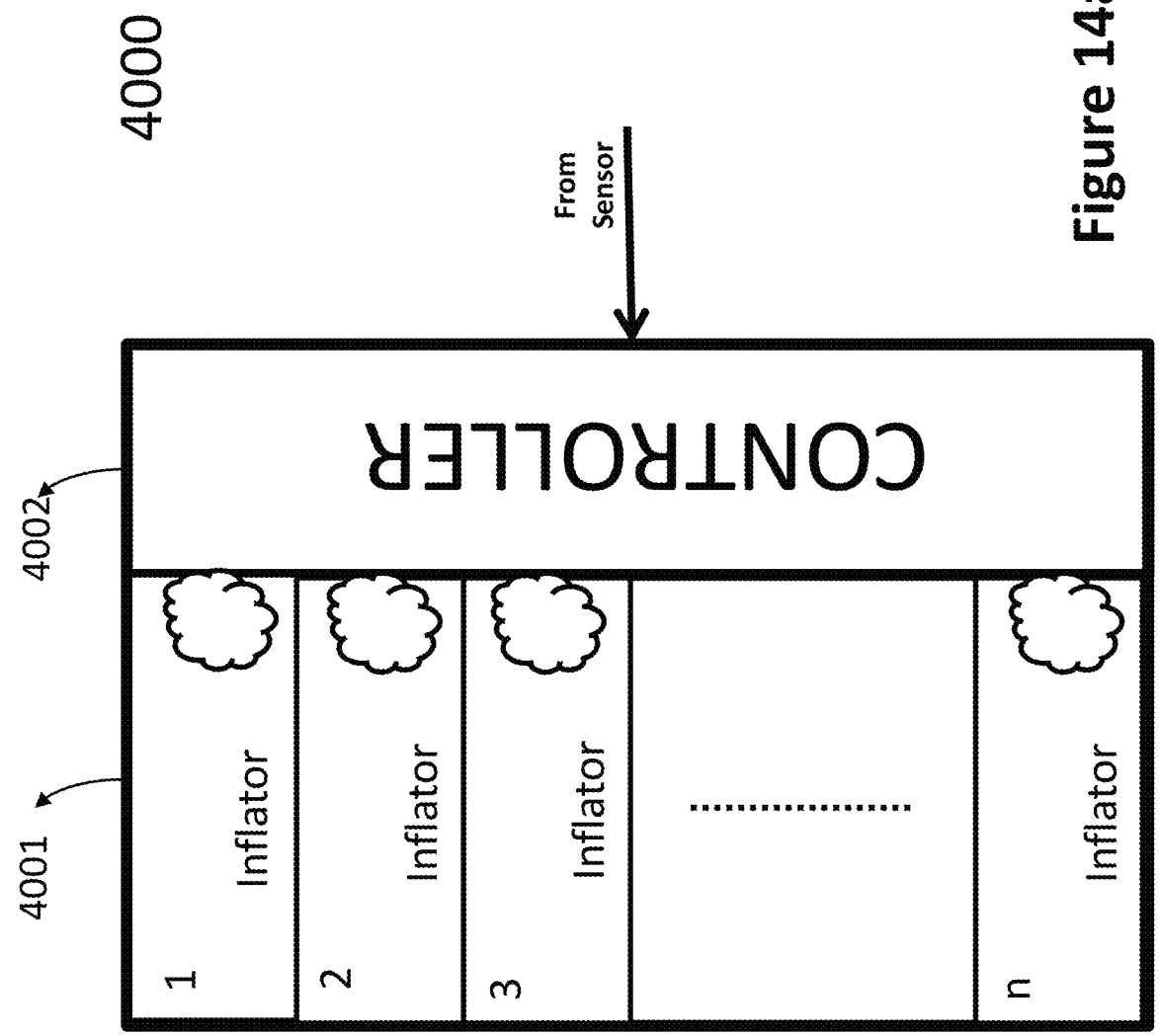

FIG. 14a depicts an embodiment of multilayer airbag inflator system 4000. In general the inflator system 4000 inflates "n" airbags independently.

The multilayer airbag inflator system 4000 includes, among other things, controller 4002, and inflator 4001.

In one embodiment of inflator system 4000, the inflator 4001 consists of "n" independent inflator each assigned to one of the airbags within multilayer airbag $3001_1$ to $3001_n$.

In one embodiment of inflator system 4000, the controller 4002 activates the "n" inflators of the inflator 4001 simultaneously.

In another embodiment of inflator system 4000, the controller 4002 activates the "n" inflators of inflator 4001 with a specific time sequence.

In another embodiment of inflator system 4000, the controller 4002 activates a subset of "n" inflators of inflator 4001 either simultaneously or with a specified time sequence based on predefined configuration parameters stored in controller 4002.

In another embodiment of inflator system 4000, the controller 4002 receives the activation information data from sensor 4004 and other entities.

FIGS. 14b and 14c depict a multilayer airbag inflating and deflating structure 5000. In general inflating structure 5000 shown in FIG. 14b designate an inflator to each airbag and inflates each airbag independently starting from last nested airbag. In the example shown in FIG. 14b which consists of 6 nested airbags, first airbag 6 which is the smallest and last nested airbag is inflated and the outer or first airbag is inflated last. During inflation each inflator uses its dedicated air tunnel to inflate its assigned airbag.

In one embodiment, controller 5001 received an information data from a sensor, evaluates the information data, and determines if the airbags or subset of airbags need to be inflated.

In another embodiment, when a subset of the airbags are inflated the one that are not inflated are the last one. For example airbag 6 in FIG. 14b is not inflated or airbags 6 and 5 are not inflated.

In another embodiment, when a subset of the airbags are inflated the gas for the airbags that are not inflated is routed to the first airbag that is inflated. For example if airbags 6 and 5 are not inflator then the gas from inflator 6 and 5 are routed to inflator 4 through the tunnel 5003. In other words all inflators are always inflated.

In another embodiment, controller 5001 based on a time sequenced stored in its memory activates inflators 5002 starting from inflator 6 for nested airbag 6 and ending with inflator 1 or outer airbag 1 using each airbag dedicated air or gas tunnel 5003.

FIG. 14c depict the deflating mechanism after impact. The deflating after impact also starts with last airbag. For example if airbags 5 and 6 are deflated then their air or gas is released through the air tunnel which other airbags are blocked from releasing air as shown by air tunnel 5007.

In one embodiment, when the last and smallest airbags are deflated and collapse the bigger and outer airbags also partially collapse and protect a wider area. For example if airbag 6 or 5 and 6 are deflated and fully collapsed then airbags 1, 2, 3, and 4 partially collapse and covers a wider area.

FIG. 15 shows an embodiment of expandable pad 6000. In general expandable pad 6000 is a polymer that expands when a voltage is applied at its two ends.

The expandable pad 6000 includes, among other things a voltage generator which applies a defined voltage across two ends of the pad.

In one embodiment of expandable pad 6000, the pad 6001 consists of a polymer with certain thickness.

In one embodiment of expandable pad 6000, the pad 6002 is the pad 6001 when expanded after a voltage is applied to its two ends to increased and expanded its thickness.

FIG. 16 depicts an embodiment of method 7000 for using multilayer airbag and expandable pad to protect a moving or flying vehicle/object. In various embodiments, method 7000 is carried out by sensor, expandable pads, multilayer airbag and controller under the control of processes or executable instructions. The readable and executable instructions reside, for example, in a data storage medium such as processor usable volatile and non-volatile memory. However, the readable and executable instructions may reside in any type of processor readable storage medium. In some embodiments, method 7000 is performed at least by one of the circuits described herein.

At 7001 of method 7000, controller resets, sets the configuration parameters and start executing the artificial intelligence executable software.

At 7002 of method 7000, controller using its artificial intelligence executable software to analyze the information data from one or multiple sensors to detect any potential or imminent impacts due to approaching objects, falling, or crash.

At 7003 of method 7000, the controller based on its configuration parameters select which expandable pad or compressed air unit to activate in order to reduce the force due to impact.

At 7004 of method 7000, the controller based on its configuration parameters selects the multilayer airbags to be inflated and activates the inflators of the airbags.

At 7005 of method 7000, the airbag inflators generate the gas that is needed to inflate the selected multilayer airbags and a voltage is applied across two ends of selected expandable pads.

Various embodiments are thus described. While particular embodiments have been described, it should be appreciated that the embodiments should not be construed as limited by such description, but rather construed according to the following claims.

The invention claimed is:

1. a smart environment comprising:
   a plurality of moving vehicles, flying vehicles, and stationary objects and a base station each with a wireless transceiver to transmit and receive an information data;
   said information data is a broadcast data or a communication data;
   said base station belongs to at least one of a $5^{th}$ generation (5G) and beyond network, a WiFi (wireless fidelity) network, and a proprietary wireless network;
   said wireless transceiver used by said plurality of moving vehicles, flying vehicles, and stationary objects acts as an internet of things (IoT) and is identified by an IP (Internet Protocol) address that is an IP4 or an IP6;
   said plurality of moving vehicles, flying vehicles, and stationary objects use said wireless transceiver or said IoT to communicate over the air with said base station to exchange IEEE1588 (Institute of Electrical and Electronic Engineering standard 1588) protocol signals in order to achieve a clock synchronization and obtain a time of the day;

said base station in said information data dynamically transmits to said IoT or said wireless transceiver indentified by said IP address and used by said plurality of moving vehicles, flying vehicles, and stationary objects an absolute time to transmit and receive said broadcast data;

said wireless transceiver or said IoT has a transmitter propagation time which is a time said information data travels through its transmitter up to its antenna port and a receiver propagation time which is a time said information data travels from its antenna port to a detector;

said information data carries a time stamp which shows the time of the day the information data was sent by said wireless transceiver;

said wireless transceiver retrieves said time stamp and said transmitter propagation time embedded in said broadcast data received from another said wireless transceiver and uses its own said receiver propagation time and said time of the day at said detector to calculate an over the air propagation time for said broadcast data;

said IoT or said wireless transceiver uses said over the air propagation time for said broadcast data to calculate a distance and an approaching speed between two said IoTs or said wireless transceivers in order to avoid a collision;

said information data exchanged between said IoTs or said wireless transceivers and between said base station and said IoTs or said wireless transceivers helps said plurality of moving vehicles, flying vehicles, and stationary objects coexist in said smart environment and operate freely without any interruption, an interference, and said collision.

2. The smart environment of claim 1, wherein a stationary object within said plurality of moving vehicles, flying vehicles, and stationary objects is a tree, a lamp post, a small cell, a building, a statue and other stationary objects.

3. The smart environment of claim 1, wherein a moving vehicle within said plurality of moving vehicles, flying vehicles, and stationary objects is a robot, a human with body armor, an automobile, a boat, a bicycle, a motorcycle and other moving vehicles.

4. The smart environment of claim 1, wherein a flying vehicle within said plurality of moving vehicles, flying vehicles, and stationary objects is a helicopter, a small plane, a flying human, a flying robot, a glider, a flying car, a drone, and other flying vehicles.

5. The smart environment of claim 1, wherein said broadcast data includes at least one of said IP address, said time stamp, said transmitter propagation time, an estimated mass of said moving vehicle, or said flying vehicle and a type of said moving vehicle, said flying vehicle, and said stationary object.

6. The smart environments of claim 1, wherein said wireless transceiver as an alternative to said IEEE1588 uses GPS (global positioning system) to achieve said clock synchronization and obtain said time of the day.

7. The smart environment of claim 1, wherein said IoT or said wireless transceiver uses said approaching speed and said estimated mass of said moving vehicle or said flying vehicle within said plurality of moving vehicles, flying vehicles, and stationary objects to calculate a force of an impact.

8. The smart environment of claim 1, wherein said IoT or said wireless transceiver communicates with said base station to obtain at least one of said time of the day, said clock synchronization and said IP address at power up.

9. The smart environment of claim 1, wherein a communication link between said IoT or said wireless transceiver and said base station uses Ethernet protocol.

10. The smart environment of claim 1, wherein said IP address for said IoT or said wireless transceiver used by said moving vehicle, said flying vehicle, or said stationary object is assigned at manufacturing.

11. The smart environment of claim 1, wherein said IoT or said wireless transceiver receives the absolute time for its transmission, reception, communication and broadcasting from said base station.

12. The smart environment of claim 1, wherein said absolute time is derived from said time of the day said IoT or said wireless transceiver obtains from said base station.

13. The smart environment of claim 1, wherein said absolute time is first microsecond in a millisecond, or nth microsecond after the start of said millisecond in said time of the day.

* * * * *